(12) United States Patent
Phifer et al.

(10) Patent No.: US 10,125,915 B1
(45) Date of Patent: Nov. 13, 2018

(54) STANDS FOR HOLDING ITEMS

(71) Applicant: Phifer Incorporated, Tuscaloosa, AL (US)

(72) Inventors: Beverly Phifer, Tuscaloosa, AL (US); Tanya Baker, Northport, AL (US); Tony Fretwell, Tuscaloosa, AL (US); David Lovelady, Northport, AL (US); Marsha Sprayberry, Tuscaloosa, AL (US); Christian Williams, Tuscaloosa, AL (US); Timothy Wilson, Moundville, AL (US); Thomas Grammer, Northport, AL (US)

(73) Assignee: Phifer Incorporated, Tuscaloosa, AL (US)

( * ) Notice: Subject to any disclaimer, the term of this patent is extended or adjusted under 35 U.S.C. 154(b) by 150 days.

(21) Appl. No.: 14/988,457

(22) Filed: Jan. 5, 2016

Related U.S. Application Data

(60) Provisional application No. 62/099,620, filed on Jan. 5, 2015.

(51) Int. Cl.
| | |
|---|---|
| *F16M 11/00* | (2006.01) |
| *F16M 11/20* | (2006.01) |
| *A47B 23/00* | (2006.01) |
| *A47B 23/04* | (2006.01) |
| *A45F 5/00* | (2006.01) |

(52) U.S. Cl.
CPC .......... *F16M 11/2021* (2013.01); *A45F 5/00* (2013.01); *A47B 23/002* (2013.01); *A47B 23/043* (2013.01); *A45F 2200/0516* (2013.01); *A45F 2200/0525* (2013.01); *A47B 2023/049* (2013.01)

(58) Field of Classification Search
CPC ..... F16M 11/2021; A47F 5/00; A47B 23/002; A47B 23/043; A47B 2023/049; A45F 2200/0516; A45F 2200/0525
USPC .......................................................... 248/454
See application file for complete search history.

(56) References Cited

U.S. PATENT DOCUMENTS

| | | | |
|---|---|---|---|
| 43,575 | A | 7/1864 | Dimon et al. |
| 264,995 | A | 9/1882 | Armstrong, Jr. |
| 352,654 | A | 11/1886 | Morton |
| 542,809 | A | 7/1895 | Reid |
| 582,140 | A | 5/1897 | Nolon |

(Continued)

FOREIGN PATENT DOCUMENTS

CN 2174093 Y 8/1994

OTHER PUBLICATIONS

"MyPlace Pro Workstation," www.asseenontv.com/prod-pages/my_pic_ontv.html, date unknown (1 page).

(Continued)

*Primary Examiner* — Anita M King
(74) *Attorney, Agent, or Firm* — Kenealy Vaidya LLP

(57) ABSTRACT

The invention is directed to stands and methods for making the same. The stand is provided to hold an item such as an electronic device and/or a document. The stand may include (1) a base plate provided to support the stand on a support surface and/or by a user holding the base plate; (2) a plurality of hinge assemblies connected to the base plate; and (3) a platform assembly pivotally connected to the hinge assemblies, such that the angular disposition of the platform assembly is adjustable relative to the base plate.

19 Claims, 34 Drawing Sheets

(56) References Cited

U.S. PATENT DOCUMENTS

| | | | |
|---|---|---|---|
| 590,175 A | 9/1897 | Trussell | |
| 793,978 A | 7/1905 | Beidler | |
| 993,761 A | 5/1911 | Crane | |
| 1,111,607 A | 9/1914 | Nyberg | |
| 1,203,659 A | 11/1916 | Smith | |
| 1,821,060 A | 12/1929 | Isaacson | |
| 1,919,835 A | 12/1930 | Giese | |
| 1,876,681 A | 9/1932 | Irwin | |
| 1,996,191 A | 4/1935 | Cook | |
| 2,003,746 A | 6/1935 | Headington | |
| 2,136,701 A | 11/1938 | Manierre | |
| 2,489,553 A | 11/1949 | Wofford | |
| 2,627,694 A | 11/1950 | Saecker | |
| 2,572,731 A | 10/1951 | Keith | |
| 2,595,682 A | 5/1952 | Lipa | |
| 3,202,471 A | 8/1965 | Wilson | |
| 3,381,928 A | 5/1968 | White | |
| 3,484,226 A | 12/1969 | Golightly | |
| 3,603,656 A | 9/1971 | Ferman | |
| 3,908,215 A | 9/1975 | Watson | |
| 3,952,989 A | 4/1976 | Hatcher | |
| 4,014,508 A | 3/1977 | Weiss | |
| 4,015,813 A | 4/1977 | Graham | |
| 4,043,530 A | 8/1977 | May | |
| 4,163,497 A | 8/1979 | McEwen | |
| 4,163,539 A | 8/1979 | Awofolu | |
| 4,372,630 A | 2/1983 | Fuhri | |
| 4,380,947 A | 4/1983 | Nishimoto | |
| D269,188 S | 5/1983 | Tisdale | |
| 4,436,271 A | 3/1984 | Manso | |
| 4,471,933 A | 9/1984 | Nelson | |
| 4,560,072 A | 12/1985 | Burrell | |
| 4,643,306 A | 2/1987 | Ryan | |
| 4,863,124 A | 9/1989 | Ball et al. | |
| 4,896,252 A | 1/1990 | Stewart | |
| 4,948,139 A | 8/1990 | Heeszel | |
| 5,100,098 A * | 3/1992 | Hawkins | F16M 11/041 |
| | | | 16/339 |
| 5,232,274 A | 8/1993 | Johan et al. | |
| 5,375,806 A | 12/1994 | Debus et al. | |
| 5,492,299 A | 2/1996 | Thermos | |
| 5,533,642 A | 7/1996 | Lafond et al. | |
| D373,600 S | 9/1996 | Oimas | |
| 5,577,628 A | 11/1996 | O'Neil et al. | |
| 5,607,135 A | 3/1997 | Yamada | |
| 5,651,525 A * | 7/1997 | Yang | A47B 23/002 |
| | | | 248/444.1 |
| 5,692,815 A | 12/1997 | Murphy | |
| 5,765,799 A | 6/1998 | Weber | |
| 5,797,578 A | 8/1998 | Graffeo et al. | |
| 5,823,500 A | 10/1998 | La Coste | |
| 5,855,329 A | 1/1999 | Pagano | |
| 5,855,351 A | 1/1999 | Cziraky | |
| 5,884,889 A | 3/1999 | Crosby | |
| 5,893,546 A | 4/1999 | Renfroe | |
| 5,944,209 A | 8/1999 | Daoud | |
| 5,974,707 A | 11/1999 | Kowalczyk | |
| 6,000,663 A | 12/1999 | Plasse et al. | |
| 6,003,446 A | 12/1999 | Leibowitz | |
| 6,038,983 A | 3/2000 | Lendl | |
| 6,045,108 A | 4/2000 | Cziraky | |
| 6,085,917 A | 7/2000 | Odom | |
| 6,109,658 A | 8/2000 | Moore | |
| 6,134,103 A | 10/2000 | Ghanma | |
| 6,302,273 B1 | 10/2001 | Edmunds | |
| 6,311,944 B1 | 11/2001 | McKsymick et al. | |
| 6,353,529 B1 | 3/2002 | Cies | |
| 6,497,391 B1 | 12/2002 | Timm | |
| 6,540,192 B2 | 4/2003 | Ouellet | |
| 6,682,038 B2 | 1/2004 | Golynsky | |
| 6,749,228 B2 | 6/2004 | Takemura | |
| 6,751,878 B2 | 6/2004 | Hamann | |
| 6,822,857 B2 * | 11/2004 | Jung | F16M 11/10 |
| | | | 248/920 |
| 6,971,622 B2 | 12/2005 | Ziegler et al. | |
| D514,057 S | 1/2006 | Borunda et al. | |
| 7,121,214 B1 | 10/2006 | Toltzman et al. | |
| 7,172,167 B2 * | 2/2007 | Phifer | A47B 23/042 |
| | | | 108/11 |
| 7,293,751 B2 | 11/2007 | Eriksson | |
| 7,604,206 B2 * | 10/2009 | Jung | F16M 11/046 |
| | | | 16/340 |
| 7,770,864 B2 * | 8/2010 | Phifer | A47B 23/043 |
| | | | 248/453 |
| 7,959,124 B2 | 6/2011 | Phifer et al. | |
| 8,123,189 B2 * | 2/2012 | Phifer | A47B 23/044 |
| | | | 108/11 |
| 8,708,301 B2 | 4/2014 | Grammer et al. | |
| 8,851,439 B2 | 10/2014 | Phifer et al. | |
| 9,291,299 B2 * | 3/2016 | Richard | F16M 11/10 |
| 9,759,372 B2 * | 9/2017 | Pigatti | F16M 13/02 |
| 2002/0044819 A1 | 4/2002 | Shamoon | |
| 2003/0010884 A1 | 1/2003 | Jones | |
| 2003/0029985 A1 | 2/2003 | Zeller et al. | |
| 2003/0183738 A1 * | 10/2003 | Weingartner | A47B 23/042 |
| | | | 248/453 |
| 2004/0256534 A1 | 12/2004 | Phifer et al. | |
| 2005/0002159 A1 * | 1/2005 | Jeong | F16M 11/10 |
| | | | 361/679.27 |
| 2005/0098703 A1 | 5/2005 | Cziraky | |
| 2005/0121594 A1 | 6/2005 | Kuo | |
| 2005/0285009 A1 | 12/2005 | Phifer et al. | |
| 2006/0108494 A1 | 5/2006 | Lancet | |
| 2006/0124822 A1 | 6/2006 | Munda et al. | |
| 2007/0221811 A1 | 9/2007 | Hauser et al. | |
| 2009/0179124 A1 | 7/2009 | Caplan | |
| 2009/0321605 A1 | 12/2009 | Petrie | |
| 2010/0006735 A1 | 1/2010 | Reinen | |
| 2011/0056412 A1 * | 3/2011 | Grammer | A45C 9/00 |
| | | | 108/6 |
| 2012/0248048 A1 * | 10/2012 | Wu | F16M 11/10 |
| | | | 211/26 |
| 2012/0273448 A1 * | 11/2012 | Hsu | F16M 11/10 |
| | | | 211/195 |

OTHER PUBLICATIONS

"Porta-Book," www.portabooktv.com/Default.asp?bhcp=1, date unknown (2 pages).
"You can do it Bindependent We Can Help, Adapt-A-Lap book Holder", Adapt-A-Lap book Holder, 4 pages from www.bindependent.com.
"Bodyguard, Nellie's Exercise Equipment . . . ", 1 page from nellies.com.
"Large and Small Paperbacks Stay . . . ", 1 page from store3.yimg.com.
"Relieve Neck and Back Pain, Improve Your Reading Immediately with Our Adjustable Book Holders", 4 pages from www.proportionalreading.com.
"AtlasTM Ergonomic Book & Copy Holders", 1 page from www.bookandcopyholders.com.
"Book Holders", 1 page from sfpl.lib.ca.us.
"You can do it Bindependent We Can Help, Two-Piece Tilting Table", 2 pages from www.bindependent.com.

* cited by examiner

390 platform assembly (bottom view)

380 platform

380

374 support lower (curved) surface

390 platform assembly (top view)

380 platform recessed section 377

380

372 receiving channel (for holding an item)

STANDS FOR HOLDING ITEMS

RELATED PATENT APPLICATION AND PRIORITY

This application claims priority to U.S. Provisional Patent Application 62/099,620 filed Jan. 5, 2015, the content of which is incorporated herein by reference in its entirety.

BACKGROUND OF THE INVENTION

The invention relates to stands to support a personal electronic device, document and/or other item.

Various devices have been used in the past to support personal electronic devices, such as an electronic tablet computer, cell phone, personal digital assistant (PDA), as well as books, documents, and various other items, for example. However, known devices for supporting such items have deficiencies.

BRIEF SUMMARY OF THE INVENTION

The invention is directed to stands and methods for making the same. The stand is provided to hold an item such as an electronic device and/or a document. The stand may include (1) a base plate provided to support the stand on a support surface and/or by a user holding the base plate; (2) a plurality of hinge assemblies connected to the base plate; and (3) a platform assembly pivotally connected to the hinge assemblies, such that the angular disposition of the platform assembly is adjustable relative to the base plate. Various other features are provided in accordance with the various embodiments of the invention.

BRIEF DESCRIPTION OF THE DRAWINGS

The present invention can be more fully understood by reading the following detailed description together with the accompanying drawings, in which like reference indicators are used to designate like elements, and in which.

DETAILED DESCRIPTION OF THE INVENTION

Hereinafter, aspects of the invention in accordance with various embodiments will be described. As used herein, any term in the singular may be interpreted to be in the plural, and alternatively, any term in the plural may be interpreted to be in the singular.

The invention provides stands, i.e., supports, and methods of making and using the same. The stands described may be used to hold a wide variety of personal electronic devices such as an electronic tablet computer, cell phone, personal digital assistant (PDA), land phone, smart phone, car phone, computer terminal, texting device, satellite radio device, voice over IP device, and/or any other mobile user device as well as other items, such as books, recipes or other documents, for example.

Figure 1:
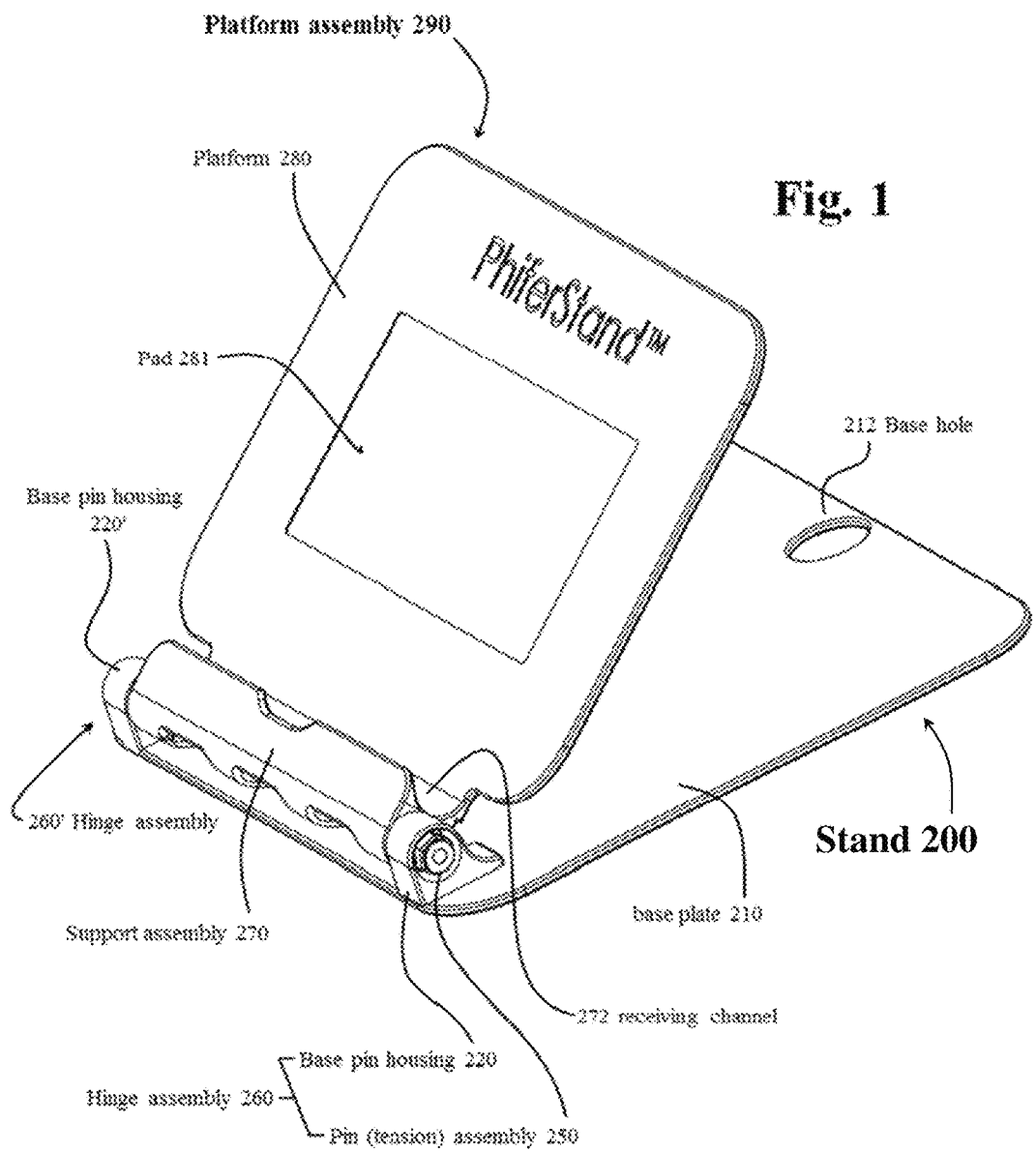
FIG. 1 is a perspective view showing various details of a stand, in accordance with one embodiment of the invention

FIG. 1 is a perspective view showing various details of a stand 200 in accordance with one embodiment of the invention.

As shown in FIG. 1, the stand 200 includes a base plate 210 and a platform assembly 290. The platform assembly 290 includes a platform 280, as well as a support assembly 270. In accord with one embodiment of the invention, the support assembly 270 is connected to a lower portion or edge of the platform 280. The platform 280, in conjunction with the support assembly 270, may be used to hold a wide variety of items (as described above) including personal electronic devices and books, for example. The base plate 210 may be placed on a wide variety of surfaces and/or secured to some suitable structure (not shown) so as to support the stand 200. Illustratively, the base plate 210 may be placed on a table or desk. Additionally, the stand 200 may be placed in and/or secured to a bag, such as a luggage case, luggage bag or similar structure, for example. Further, so as to support the stand 200, the base plate 210 might be secured to some structure such as by clamping, tying, strapping, adhesive, mechanical fastener, magnetic fastener and/or some other attachment mechanism. Illustratively, the base plate 210 may be secured to a structure using "zip ties" or VELCRO. The base plate 210 includes a base hole 212 to assist in such securement of the base plates 210. In addition, it should of course be appreciated that the stand 200 may be supported by a user holding the base plate 210 and/or the user holding some other component of the stand 200.

As described above, the stand 200 includes the base plate 210, the platform 280 and the support assembly 270. The platform 280 and support assembly 270 collectively constitute a platform assembly 290. Various further details of each of these components of the stand 200 are described below. In a typical use, an item is supported collectively by the platform 280 and the support assembly 270. More specifically, an item may rest on and/or against the platform 280 with a lower edge of the item, such as a cell phone, supported by and disposed in a receiving channel 272 of the support assembly 270. As shown, the receiving channel 272 may be curved or U-shaped. Such a shape for the receiving channel 272 may effectively "cradle" an item, so as to effectively support the item in some static position and prevent the item from slipping or falling off the stand 200. It should of course be appreciated that the receiving channel 272 is not limited to such shape, and may be in the form of other shapes, as may be desired.

Figure 19:
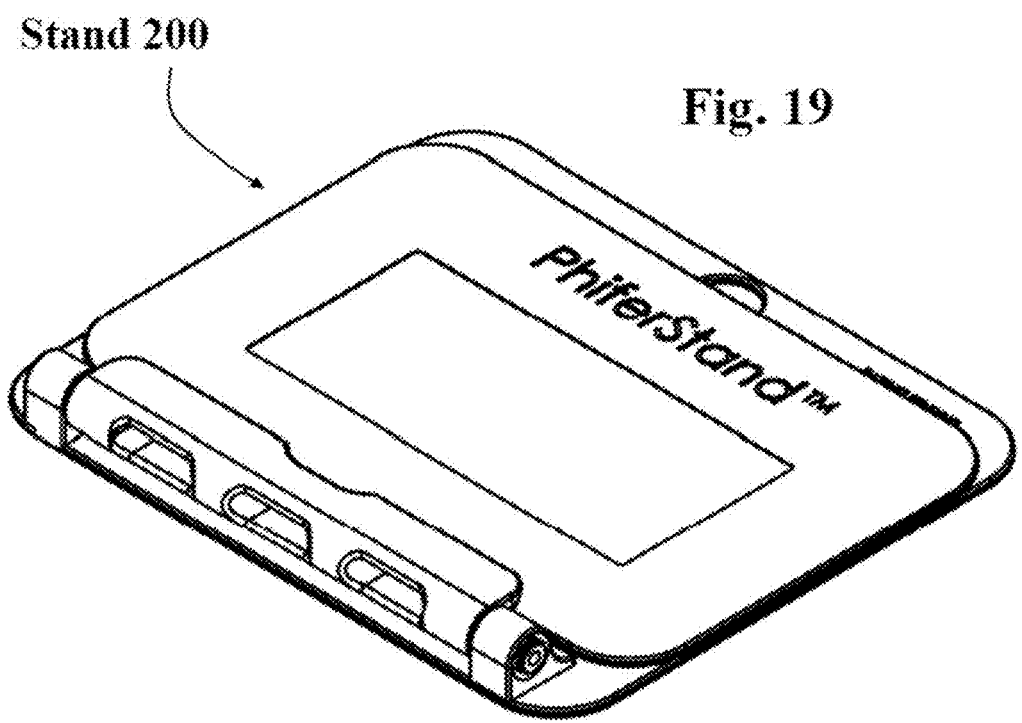
FIG. 19 is a perspective view of a stand in a closed, stowed arrangement, in accordance with one embodiment of the invention.

The support assembly 270 (which in turn is attached to and supports the platform 280) is pivotally attached to the base plate 210. Accordingly, the platform assembly 290 may be positioned in a deployed arrangement (relative to the base plate 210) or in a stowed arrangement (relative to the base plate 210). Such a stowed arrangement is shown in FIG. 19 and described further below. In a stowed arrangement, the platform 280 may be disposed adjacent to and parallel to the base plate 210. The pivotal attachment of the platform 280 with the base plate 210 allows the platform assembly 282 to be disposed at an angle (relative to the base plate 210) as may be desired. Accordingly, the positioning of the platform 280 is certainly not limited to the position shown in FIG. 1. With the arrangement shown in FIG. 1, it is appreciated that the platform 280 may be disposed anywhere between a 0 degree angle as shown in FIG. 19 (at which the platform 280 is disposed parallel to the base plate 210) and approximately a 210 degree angle at which position the platform 280 actually extends across a plane formed by the base plate 210. Such an arrangement might be desired in a situation where a user is holding the base plate 210 with the platform 280 (with support assembly 270) pivoted around—so as to support the item in front of the user with the user's hands below the item and towards the user vis-à-vis the item. On the other hand, the stand might be held by the user with the arrangement shown in FIG. 1. It is of course appreciated that any of a wide variety of arrangements might be utilized depending on any of a wide variety of factors, such as the manner in which the stand 200 is supported or held by the user.

As described above, the platform assembly 290 is pivotally attached to the base plate 210. Such pivotal attachment is provided using a pair of hinge assemblies (260, 260') as shown in FIG. 1. Illustratively, the hinge assembly 260 includes a base pin housing 220 and pin assembly 250. As shown in FIG. 1, the base pin housing 220 is connected to the base plate 210 using screws or rivets, for example. The base pin housing 220, in turn, supports the pin assembly 250 in such manner that the pin assembly 250 is pivotally disposed within the base pin housing 220. As described in detail below, an end of the pin assembly 250 is threaded into a respective end of the support assembly 270 so as to be fixedly attached to the support assembly 270. The hinge assembly 260 and the hinge assembly 260' may be similarly constructed and "mirror image" relative to each other.

As shown in FIG. 1, the platform 280 (of the platform assembly 290) may be provided with various arrangements so as to secure and/or attach, for example, an item to the platform 280. Accordingly, the platform 280 might include a pad 281 as shown in FIG. 1. Such a pad 281 might provide a cushioned surface so as to support an item, such as a cell phone of the user. Such a pad might be constructed so as to prevent slippage of a supported item. For example, the pad might be constructed of a slip resistant rubber material. However, various other arrangements and/or mechanical devices might be utilized to secure an item on the platform 280 or assist in resting an item upon the platform 280.

Figure 2:
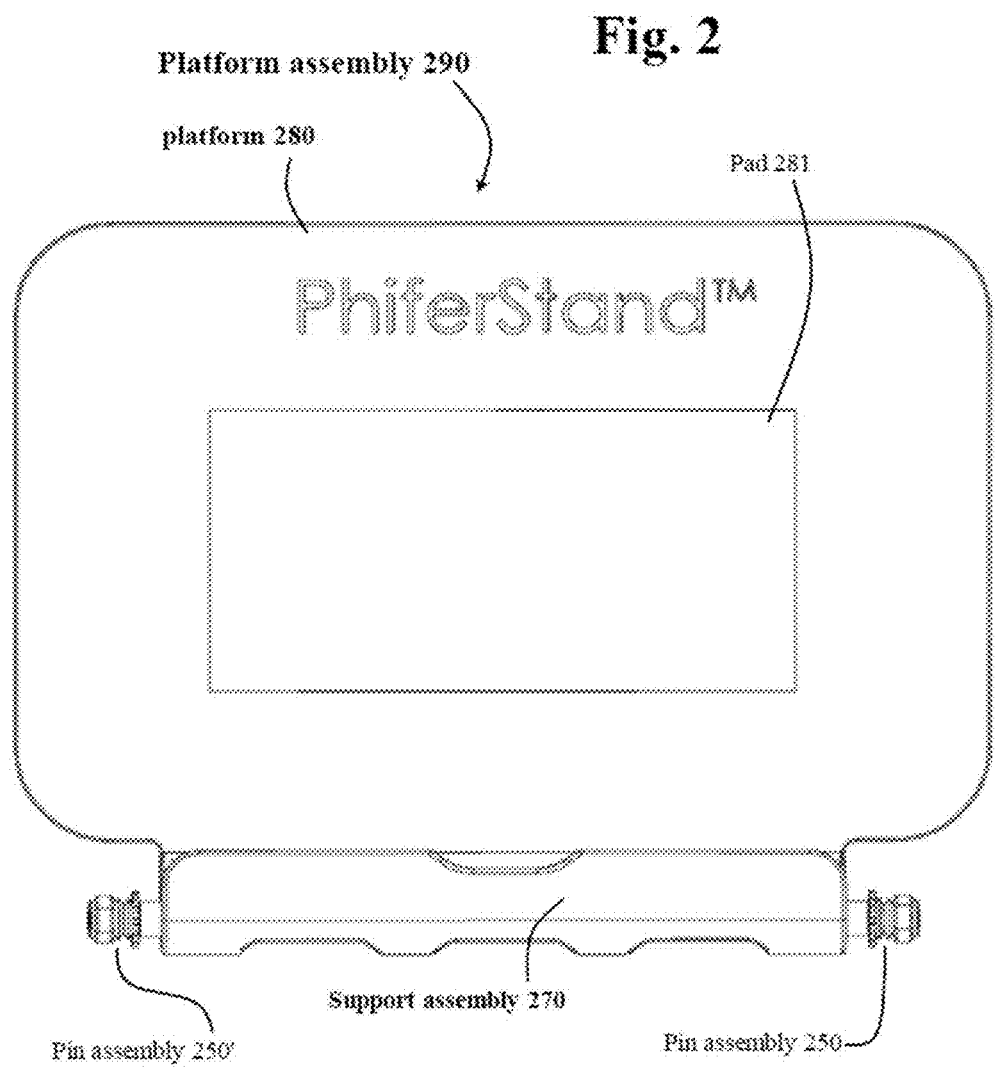
FIG. 2 is a front view of the platform assembly with pin assemblies of FIG. 1, in accordance with one embodiment of the invention.

FIG. 2 is a front view of the platform assembly 290 with pin assemblies of FIG. 1 in accordance with one embodiment of the invention. As characterized herein, the platform assembly 290 includes the platform 280 and the support assembly 270. Accordingly, in FIG. 2 the two base pin housings (220, 220') are not shown. FIG. 2 shows that each pin assembly (250, 250') is respectively threaded into an end of the support assembly 270. Such arrangement is described in further detail below, in particular with reference to FIGS. 4-8.

Figure 3:
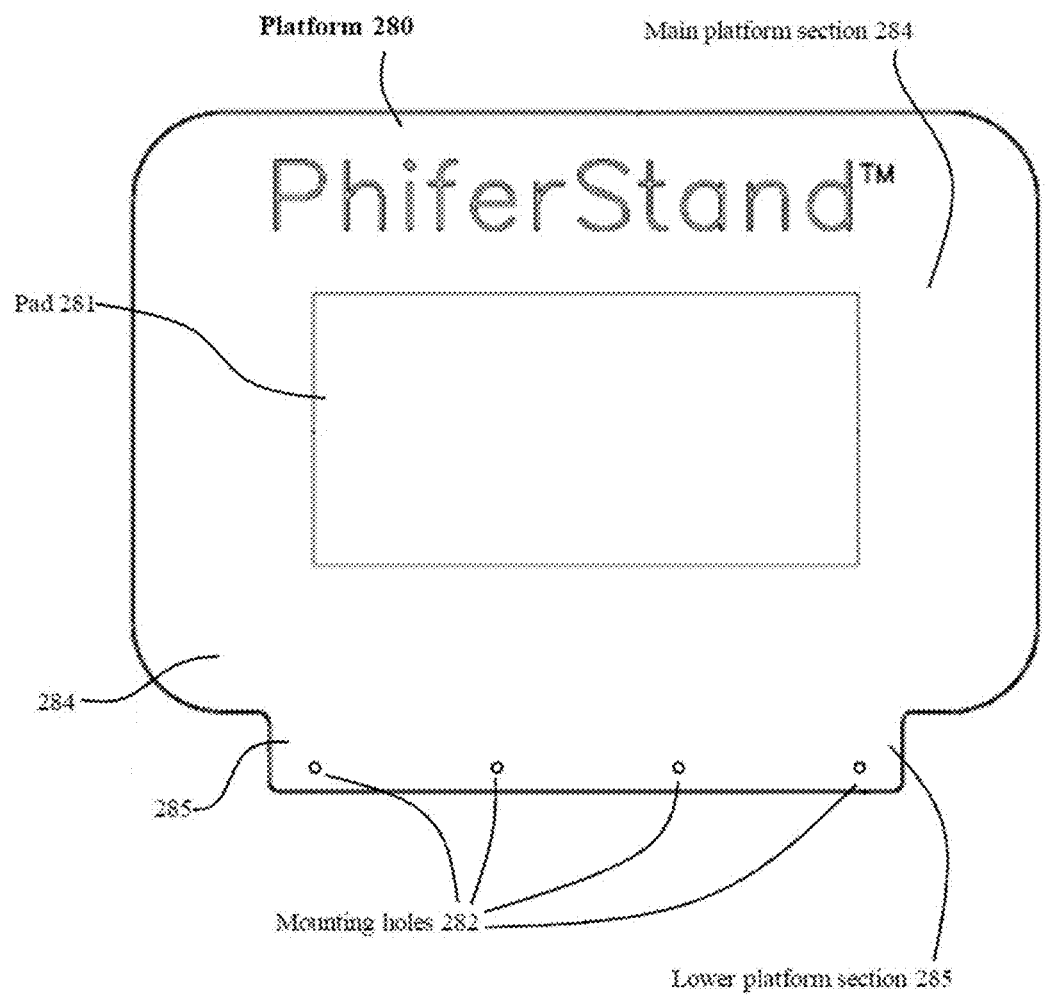
FIG. 3 is a front view of the platform of FIG. 1, in accordance with one embodiment of the invention.

FIG. 3 is a front view of the platform 280 of FIG. 1 in accordance with one embodiment of the invention. As shown, the platform 280 includes a main platform section 284 and a lower platform section 285. The main platform section extends above the support assembly 270 and provides the primary surface upon which an item is disposed in use of the stand 200, in accordance with one embodiment of the invention. Accordingly, the lower platform section 285, of the platform 280, is positioned along, and connected to, a back support surface 273 of the support assembly 270. The lower platform section 285 may be connected to the support assembly 270 in any suitable manner. In particular, as illustrated in FIG. 3, the platform 280 may be provided with a plurality of mounting holes 282 in the lower platform section 285. Screws or some other mechanical attachment may be disposed through the mounting holes 282 and into the support assembly 270. Alternatively, the lower platform section 285 might be adhesively connected to the support assembly 270. In a further embodiment, the platform 280 might be integrally formed with the support assembly 270, such as through a suitable molding process. For example, such components might be molded from plastic.

As shown in FIG. 3 (as well as the further embodiment of FIG. 20), the main platform section 284 has a rectangular shape. Further, the lower platform section 285 has a more elongated rectangular shape. However, it is appreciated that the main platform section 284 and the lower platform section 285 is not limited to such geometrical shape. For example, the main platform section 284 might be circular in shape, square in shape, or any other shape as desired. In similar manner, the lower platform section 285 might be square in shape or some other shape as desired. However, it may be desirable to construct the lower platform section 285 in such manner so as to mate with the support assembly 270 As otherwise described herein, the platform 280 may include a pad 281. For example, the pad 281 might be constructed of rubber or foam to better support an item (and maintained a position of an item) supported by the support assembly 270 and the platform 280.

Figure 4:
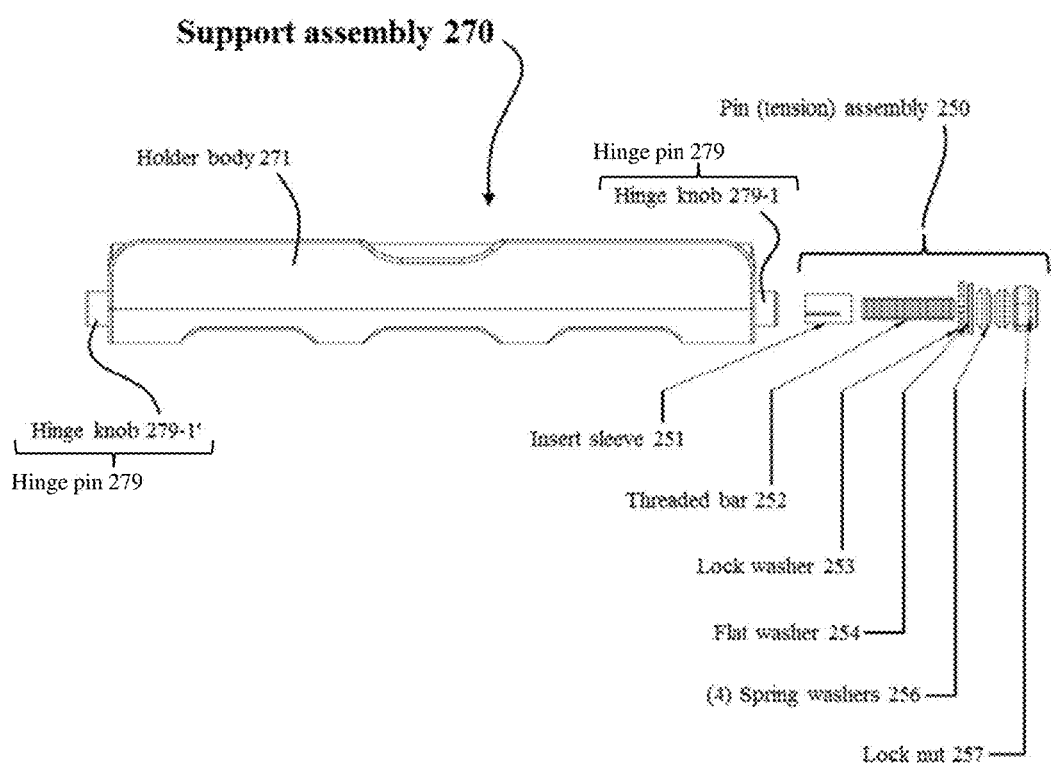
FIG. 4 is an exploded view of a support assembly with pin assembly, in accordance with one embodiment of the invention.

FIG. 4 is an exploded view of a support assembly 270 with pin assembly 250, in accordance with one embodiment of the invention.

Figure 7:
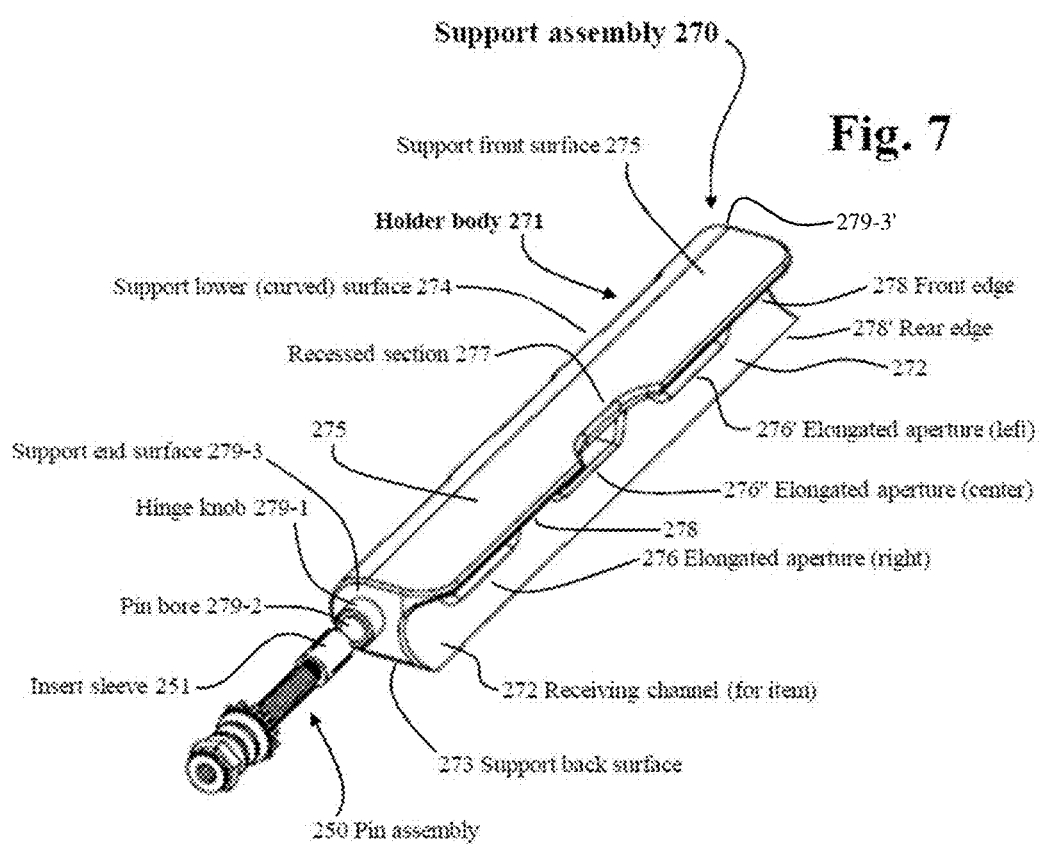
FIG. 7 is a perspective view of a support assembly with pin assembly, in accordance with one embodiment of the invention.

As shown in FIG. 4, the support assembly 270 includes a holder body 271. The holder body 271 extends a substantial length of the support assembly 270. Further details of the support assembly 270, and in particular the holder body 271, are described below. As shown in FIG. 4, at opposing ends of the holder body 271 are disposed respective hinge knobs (279-1, 279-1') collectively referred to as hinge pins 279. Further, disposed in each respective hinge knob (279-1, 279-1') is constructed a pin bore (279-2, 279-2'), as shown in FIG. 7. Each pin bore, i.e., hole, is constructed to receive a corresponding insert sleeve 251—which in turn receives a threaded bar 252 (i.e., threaded rod) of a pin assembly 250.

Figure 5:
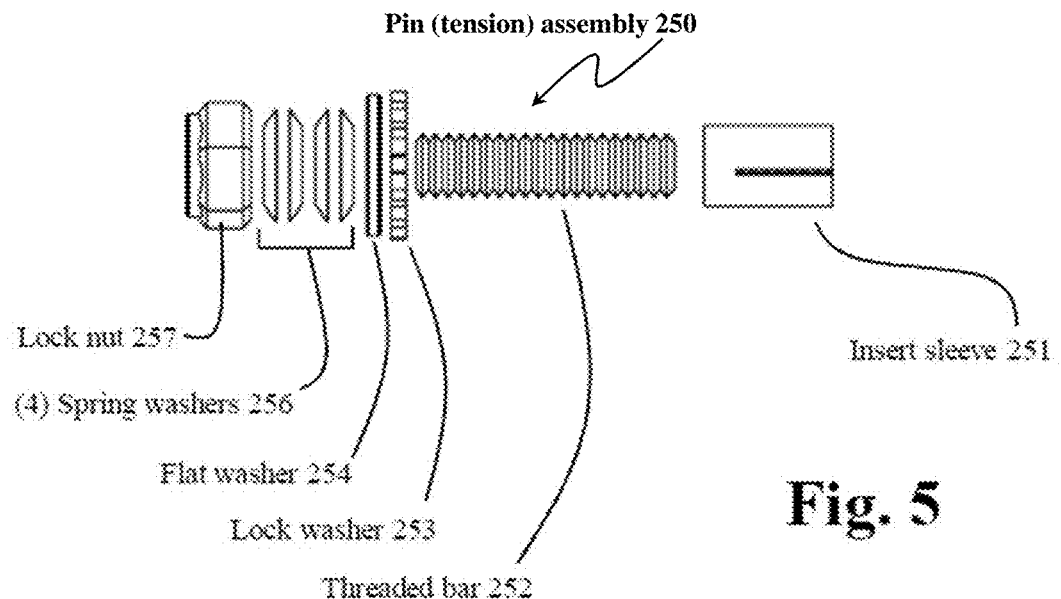
FIG. 5 is a back view of the pin assembly of FIG. 4, showing further detail, in accordance with one embodiment of the invention.
Figure 6:
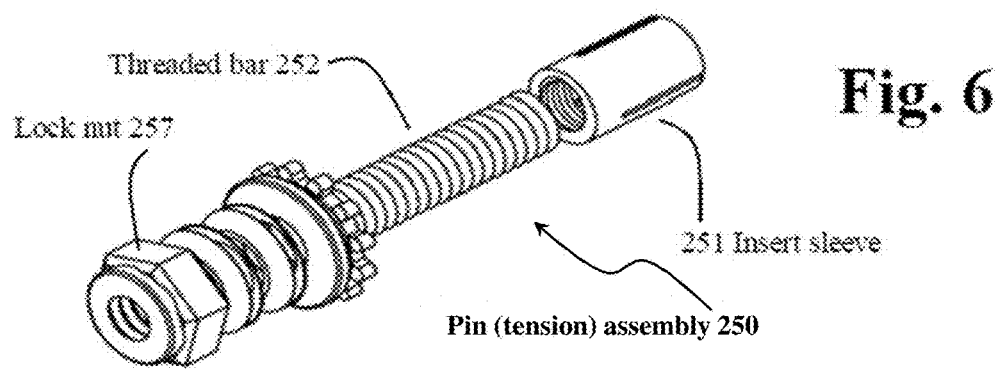
FIG. 6 is a perspective view of the pin assembly of FIG. 4, showing further detail, in accordance with one embodiment of the invention.

Hereinafter further specifics of the two pin assemblies 250 will be described. The pin assemblies on each end may be of the same construction. As shown in FIG. 4, the pin assembly 250 includes an insert sleeve 251, a threaded bar 252, a lock washer 253, a flat washer 254, a plurality of spring washers 256, and a lock nut 257. For example, the pin assembly 250 may include four (4) spring washers 256. FIG. 5 is a back view of the pin assembly 250 of FIG. 4, showing further detail, in accordance with one embodiment of the invention. In addition, FIG. 6 is a perspective view of the pin assembly 250 of FIG. 4, showing further detail, in accordance with one embodiment of the invention.

In accord with embodiments of the invention, further details will be described below regarding the particular manners in which the support assembly 270 may be mounted to the base pin housings (220, 220') using the pin assemblies 250. In accordance with one embodiment of the invention, an insert sleeve 251 is inserted into a pin bore 279-2 of the support assembly 270 (see FIG. 4 and FIG. 7 which show an exploded view of the insert sleeve 251 disposed outside the pin bore 279-2, i.e. prior to insert of the insert sleeve 251 into the pin bore 279-2). The insert sleeve 251 may be secured within the pin bore 279-2 in any suitable manner, such as through a tight frictional fit and/or using an adhesive, for example. Also, a set screw 279-4 might be utilized, i.e., threadably disposed in the holder body 271 and engageable with the insert sleeve 251 (see FIG. 9, for example).

The insert sleeve 251 may well be constructed of metal. The insert sleeve 251 may be smooth on an outer diameter thereof—so as to mate with an inner diameter of the pin bore 279-2. The insert sleeve 251 may be threaded on an inner diameter thereof, so as to mate with the outer diameter of the threaded bar 252. Further, the insert sleeve 251 may be provided with one or more slits extending a portion of the length of the insert sleeve, with multiple slits disposed around an outer diameter of the insert sleeve 251. Such slits may provide for some "give" in the insert sleeve 251 so as to provide for a tight fit of the insert sleeve 251 within the pin bore 279-2.

Once the insert sleeve is positioned in the pin bore 279-2, the base pin housing 220 may then be slid over the hinge knob 279-1. In accordance with embodiments of the invention, the base pin housing 220 is constructed so as to fit snugly over the hinge knob 279-1. Such snug and/or tight arrangement provides a resistance to rotation of the hinge assembly (260, 260') in embodiments of the invention. Further details are described below.

The threaded bar 252 is then threaded into the insert sleeve 251 and disposed so as to pass through a bore in the base pin housing 220. Thereafter, the remaining components (253, 254, 256, 257) are slid and/or screwed onto the threaded bar 252. As the lock nut 257 is tightened, the base pin housing 220 is secured to the support assembly 270. Relatedly, the lock washer 253, the flat washer 254, in the spring washers 256 prevent loosening of the lock nut 257 on the threaded bar 252. Further, the lock washer 253 may be disposed so as to exert pressure on a counterbore surface of the base pin housing 220, as described below.

However, it is appreciated that the invention is not limited to the particular arrangement shown in FIG. 4. Indeed, a lock nut 257 might be used without any washers and/or with another combination of washers—in particular in the situation where the lock nut 257 is constructed in a manner to prevent rotation on the threaded bar 252. Further, another mechanical fastener might be used in lieu of the lock nut 257, such as a Cotter pin arrangement, for example.

It is appreciated, that the amount of force required and/or desired to pivot the platform assembly 290 about the base pin housings (220, 220') may vary depending on the particular application of the stand 200. Thus, a stand designed to support a book might be provided with a larger amount of force required to pivot the platform assembly 290 about the base pin housings (220, 220') vis-à-vis a stand designed to support a small electronic device. In general, in accordance with embodiments of the invention, it is appreciated that the amount of force required to pivot the platform assembly 290 should be low enough such that a user might pivot the platform assembly 290 with reasonable effort. Additionally, the amount of force should be low enough such that a user will not break a component of the standard 200 in conjunction with pivoting (or attempting to pivot) the platform assembly 290. However, it is appreciated that the amount of force required to pivot the platform assembly 290 should not be so low that the platform assembly 290 pivots in an undesired manner under the weight of an item disposed in the platform assembly 290 (of the stand 200). In accordance with one embodiment of the invention, the amount of force needed to pivot the platform assembly 290 is dependent on the tightness of the fit of the base pin housing 220 about the hinge pin 279. Further details are described below.

Illustratively, the support assembly 270 may be constructed of plastic and the pin assembly 250 (including the insert sleeve 251) constructed of metal. However, it is appreciated that various other materials might be alternatively used in construction of the stand 200.

FIG. 7 is a perspective view of a support assembly 270 with pin assembly 250. In accordance with one embodiment of the invention. As otherwise described herein, the support assembly 270 may be constructed of plastic, for example.

As shown in FIG. 7, the support assembly 270 includes a holder body 271. The holder body 271 is provided to support an item resting upon the stand 200, in conjunction with the platform 280. In particular, the holder body 271 is provided to support a lower edge of an item resting on stand 200, so as to prevent such an item from sliding off of the stand 200.

As shown in FIG. 7, the holder body 271 may be an elongated shape with a respective support end surface 279-3 (279-3') at each opposing end of the holder body 271. As shown, on each respective support end surface (279-3, 279-3') is disposed a hinge knob (279, 279'), i.e., at each opposing end of the holder body 271. As otherwise described herein, each hinge pin 279 (279-1, 279-1') is provided with a pin bore (279-2, 279-2'), which is threaded or which receives a corresponding threaded insert sleeve 251 (to engage with threaded bar 252) as shown in FIG. 4, for example. The hinge knob (279-1, 279-1') of the pin assembly 250 serves to pivotally support the support assembly 270.

In further explanation of the holder body 271, such holder body includes a support back surface 273 which is provided to mate with the lower platform section 285 of the platform assembly 280. The support back surface 273 extends along the length of the holder body 271, i.e., extends between the two opposing support end surfaces (279-3, 279-3'). The support back surface 273 may be provided to extend downward from a rear edge 278' of the support assembly 270. As shown in FIG. 7 and FIG. 3, such mating surfaces are simply constituted by respective "flat" surfaces. However, it is appreciated that the invention is not limited to such arrangement. Illustratively, the lower platform section 285 and/or the support back surface 273 may be provided with mating ridges, grooves, protuberances and/or other surface variation so as to assist in securing the support back surface 273 to the lower platform section 285, and preventing relative movement there between.

The holder body 271 further includes a support front surface 275. The support front surface 275 extends along the length of the holder body 271, i.e., extends between the two opposing support end surfaces (279-3, 279-3') as shown in FIG. 7. Accordingly, in typical use of the stand 200, the support front surface 275 will face the user. The support front surface 275 may be provided to extend downward from a front edge 278 of the support assembly 270. The support front surface 275 may be provided with a recessed section 277 disposed along a distance in the center of the support front surface 275. For purposes of illustration, the length of the support front surface 275 might be 7 inches and the length of the recessed section 277 might be 1.5 inches. However, the invention is of course not limited to such dimensions. The recessed section 277 may be provided to assist in the user gaining a handhold of an item disposed on the stand 200. In addition, the recessed section 277 may be provided for aesthetic reasons.

As shown in FIG. 7, the support assembly 270 also includes a support lower surface 274. The support lower surface 274 may be curved in construction and serve to join the support back surface 273 with the support front surface 275 via a smooth, contiguous, rounded surface. The support lower surface 274, as well as other features of the support assembly 270, are described in further detail below.

As shown in FIG. 7, a receiving channel 272 extends along the length of the support assembly 270 and extends between the front edge 278 and the rear edge 278'. The receiving channel 272 may be curved in construction so as to receive an item that is placed on the stand 200. As shown in FIG. 7, the receiving channel 272 may possess a smooth curve. Further, it may be desired that the curve of the receiving channel 272 matches the curve of the support lower surface 274. However, it is appreciated that the invention is not limited such dimensionalities and spatial arrangements. For example, in some applications of the stand 200, it may be desired to leave the support lower surface 274 curved, as shown in FIG. 7, and construct the receiving channel 272 to possess a rectangular channel shape, i.e., in which the opposing walls of the receiving channel 272 are at right angles to a floor of such channel. However, such channel arrangement is merely illustrative and various other arrangements and/or shapes might be utilized as desired.

The support assembly 270 may also be provided with a plurality of elongated apertures (276, 276', 276") disposed along the length of the holder body 271. As illustrated in FIG. 7, the holder body 271 may include three (3) such elongated apertures including, as shown, a right elongated aperture 276, a left elongated aperture 276', and a center elongated aperture 276". The elongated apertures (276, 276', 276") may be provided to assist a user in disengaging an item from resting on the support assembly 270. The elongated apertures (276, 276', 276") may also be provided to reduce the amount of material needed to construct the support assembly 270, such as in a plastic molding process. In addition, the apertures (276, 276', 276") might be provided for aesthetic look and/or to limit the collection of undesired material upon the receiving channel 272 including, for example, water. In general, it is appreciated that the particular dimensions and size of such elongated apertures 276 may vary as desired.

Figure 8:
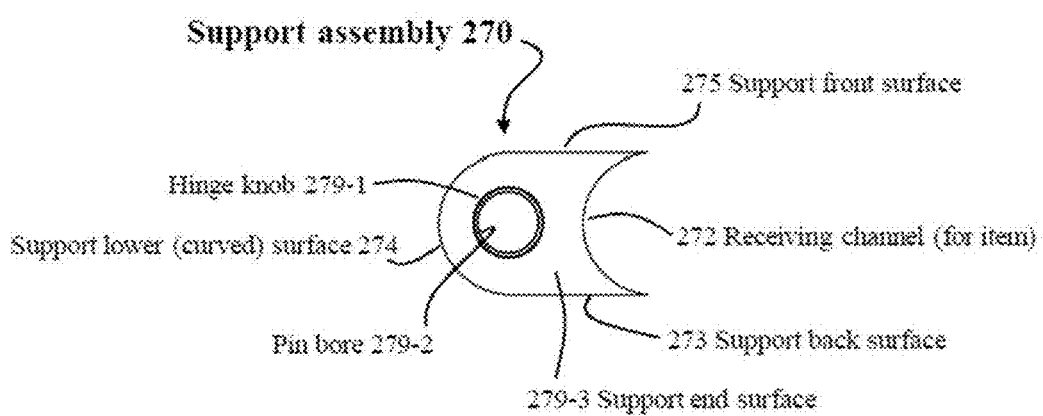
FIG. 8 is an end view of the support assembly, in accordance with one embodiment of the invention.

FIG. 8 is an end view of the support assembly 270, in accordance with one embodiment of the invention. Accordingly, FIG. 8 shows in further detail various features of the support assembly 270. As shown in FIG. 8, the support assembly 270 includes a support front surface 275 and (on an opposing backside) a support back surface 273. Forming a top surface, a curved receiving channel 272 effectively joins the support front surface 275 with the support back surface 273. Also, forming a lower surface, a curved support lower surface 274 effectively joins the support back surface 273 with the support front surface 275, i.e., forming a lower surface of the support assembly 270. FIG. 8 also shows the support end surface 279-3, a hinge knob 279-1, and a pin bore 279-2 as are otherwise described herein. The embodiment of FIG. 20 may be provided with such construction, as desired.

Figure 9:
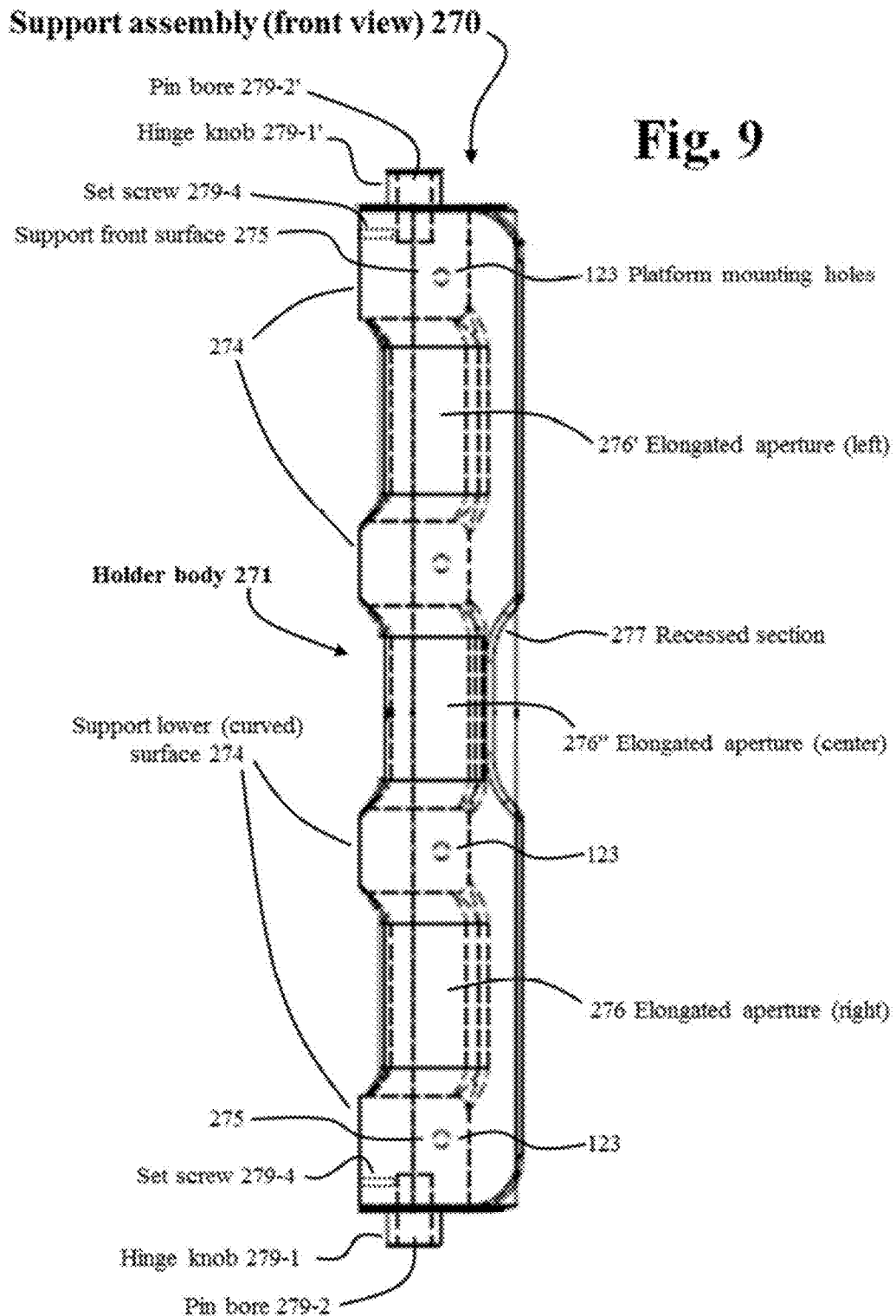
FIG. 9 shows further detail of the support assembly, in accordance with embodiments of the invention.
Figure 10:
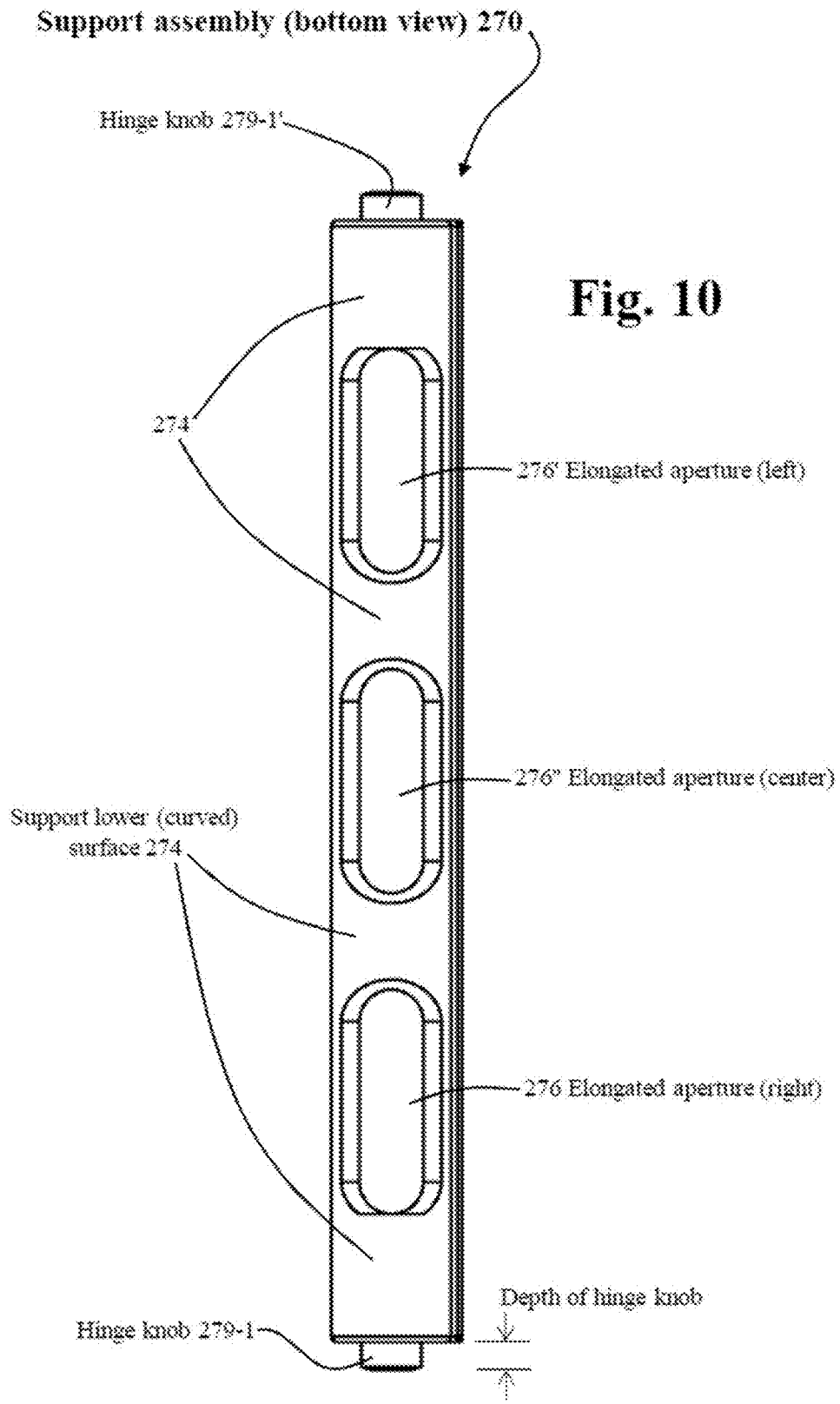
FIG. 10 shows further detail of the support assembly, in accordance with embodiments of the invention.
Figure 11:
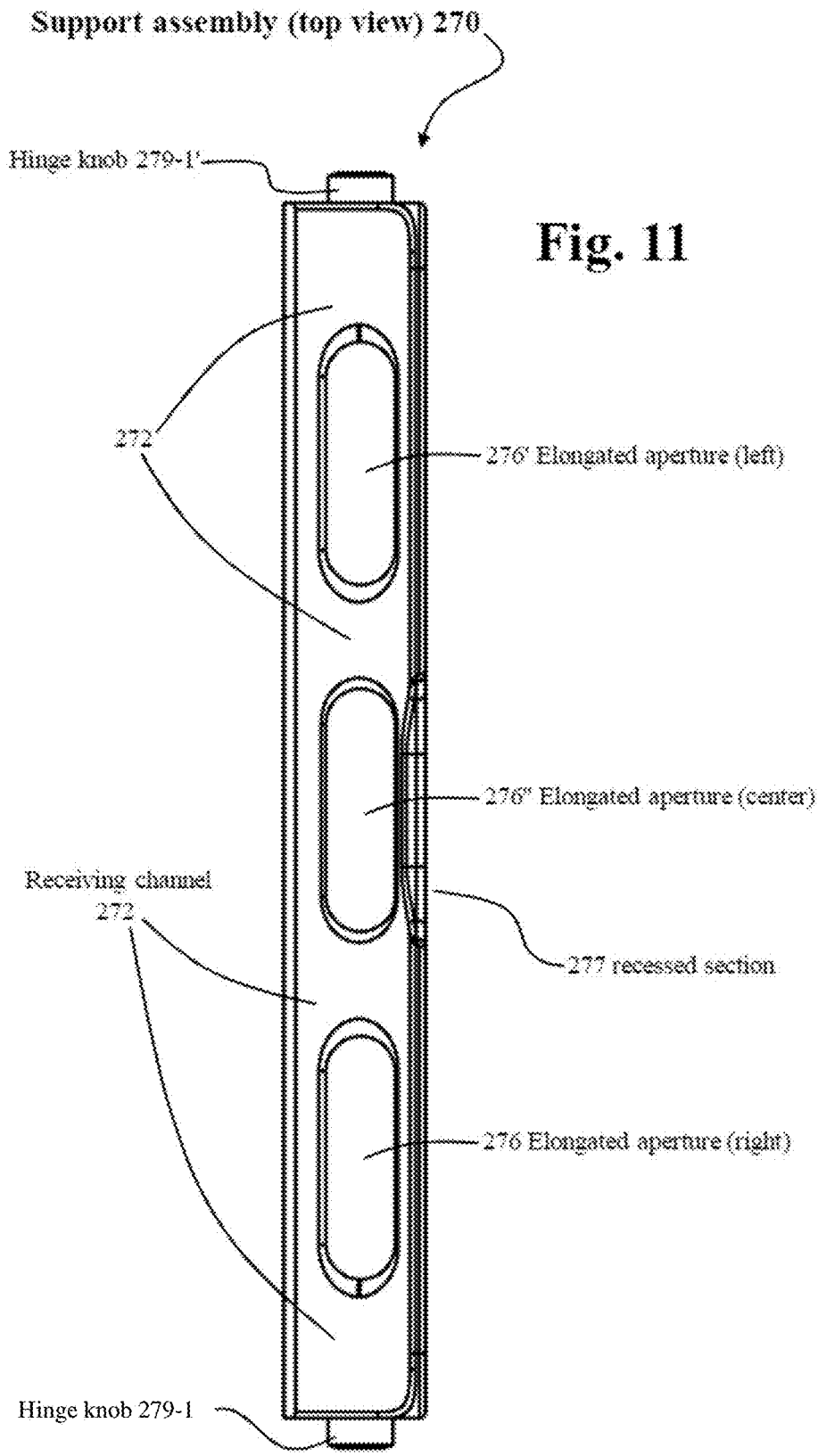
FIG. 11 shows further detail of the support assembly, in accordance with embodiments of the invention.

FIG. 9-FIG. 11 show further detail of the support assembly 270, in accordance with embodiments of the invention. Specifically, FIG. 9 shows a front view of the support assembly 270, in accordance with one embodiment of the invention. Further, FIG. 10 shows a bottom view of the support assembly 270, in accordance with one embodiment of the invention. In addition, FIG. 11 shows a top view of the support assembly 270, in accordance with one embodiment of the invention. As shown, the support assembly 270 includes a plurality of platform mounting holes 123, which provides a screw passage hole, for example, to secure the support assembly 270 onto the platform 280.

Figure 12:
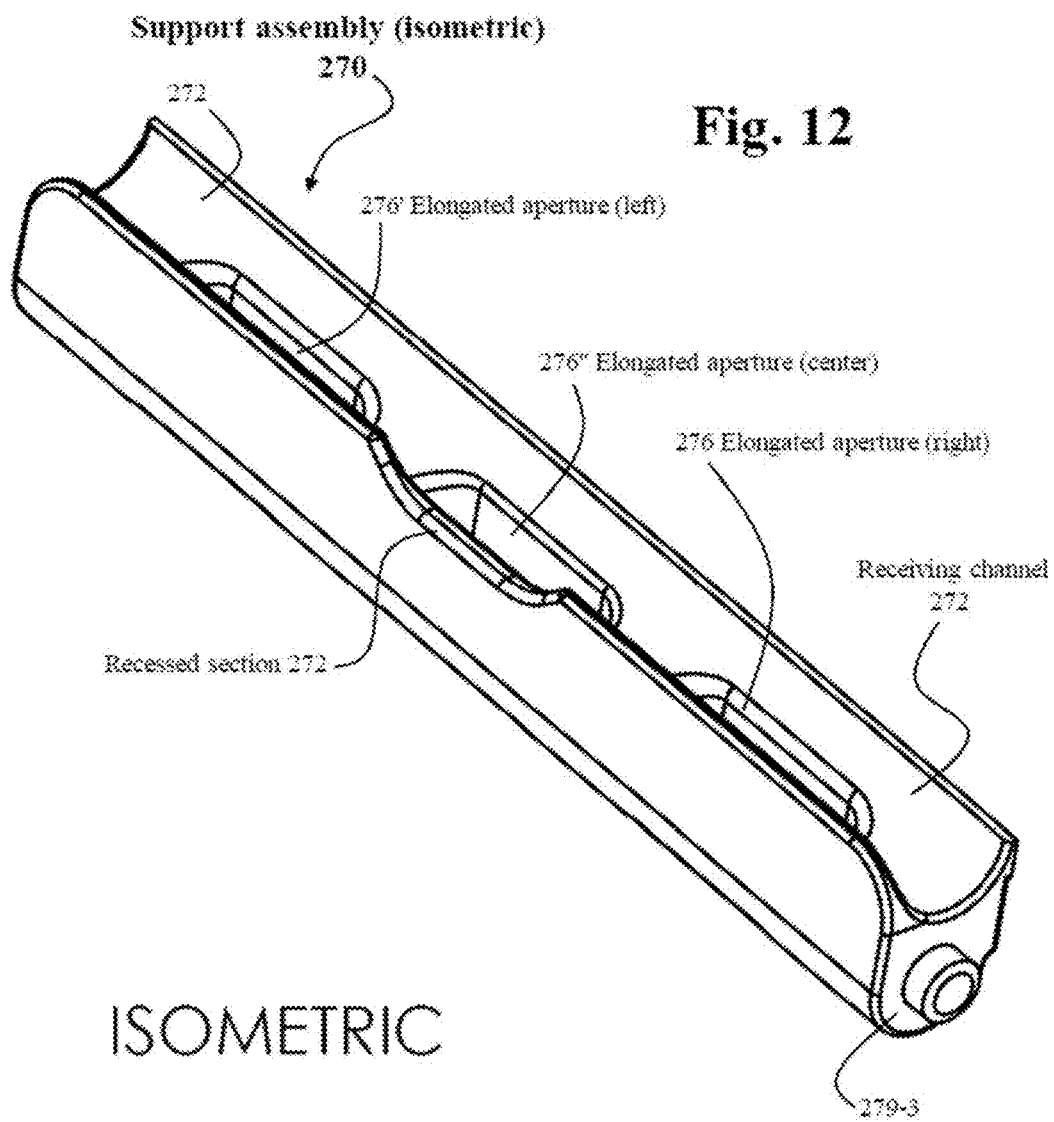
FIG. 12 shows an isometric view of the support assembly, in accordance with one embodiment of the invention.

Relatedly, FIG. 12 shows an isometric view of the support assembly 270, in accordance with one embodiment of the invention. It is appreciated that the support assembly 270, as illustrated in FIG. 12 for example, might be constructed of a plurality of discrete components. For example, such discrete components might be respectively constructed utilizing a molding process and thereafter joined together in some manner, such as by adhesively joining the discrete components of the support assembly 270 together. However, it is appreciated that any or all of the support assembly 270 might be constructed together, i.e., such as in one integral molding process.

Figure 13:
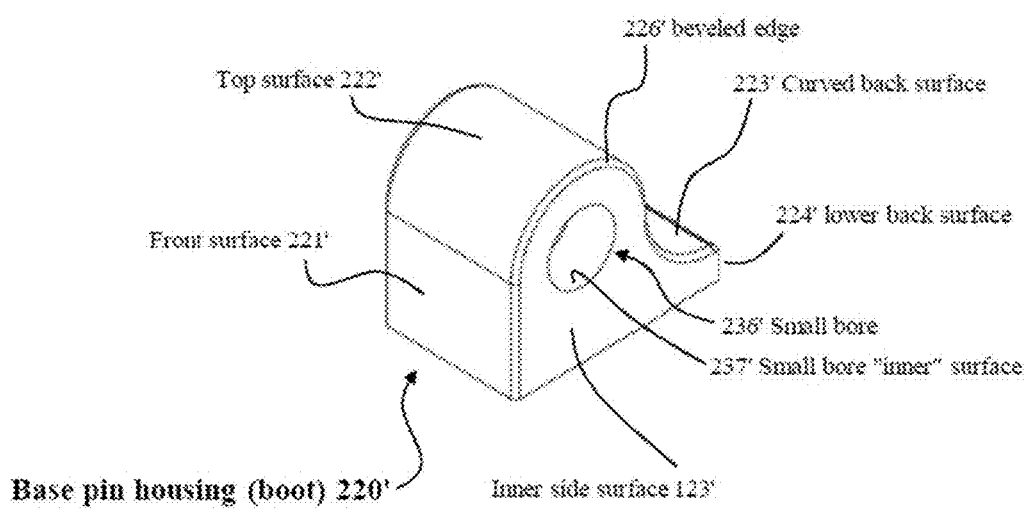
FIG. 13 is a perspective view of a base pin housing, in accordance with one embodiment of the invention.

FIG. 13 is a perspective view of a base pin housing 220', in accordance with one embodiment of the invention. The base pin housing 220' might be characterized as a "boot". It is appreciated that the base pin housing 220' as shown in FIG. 13 would be disposed on the left-hand side of the stand 200 as such is shown in FIG. 1.

As shown in FIG. 13, the base pin housing 220 includes a front surface 221' and a curved back surface 223'. As shown in FIG. 1, for example, the front surface 221' faces toward the user. On the other hand, the curved back surface 223' opposes the front surface 221'. Accordingly, the curved back surface 223' faces towards the back of the stand 200 in the arrangement shown in FIG. 1, in accordance with one embodiment of the invention.

With the structure of the base pin housing 220' as shown in FIG. 13 and in FIG. 1, the front surface 221' is flat. On the other hand, the curved back surface 223' is curved in a linear-concave manner as shown. A lower back surface 224' may be disposed at a lower edge of the curved back surface 223'. As illustratively shown in FIG. 13, the lower back surface 224' may be vertically oriented.

As shown in FIG. 13, the base pin housing 220' also includes a top surface 222'. The top surface 222' joins the front surface 221 to the curved back surface 223'. The top surface 222' may be curved in a linear-convex manner as shown. Further, the top surface 222' may be curved so as to provide a smooth continuous surface to adjoin the front surface 221' with the curved back surface 223'.

As also shown in FIG. 13, the base pin housing 220' includes an inner side surface 123'. The inner side surface adjoins each of the front surface 221', the top surface 222, the curved back surface 223', and the lower back surface 224'. Such surfaces may be joined with a beveled edge 226', as shown. The base pin housings 320, 320' of FIG. 20 may be similarly constructed, in accordance with one embodiment of the invention.

The base pin housing 220' further includes a small bore 236'. The small bore 236' comprises a small bore "inner" surface 237'. In accord with embodiments of the invention, it is the small bore inner surface 237' that engages with the hinge knob 279-1' of the support assembly 270—such engagement providing frictional rotational resistance to support the platform assembly 290 at a particular desired angle, such as in the arrangement shown in FIG. 1 for example. In other words, the outer diameter (OD) of the hinge knob 279-1' (of the support assembly 270) is toleranced vis-à-vis the inner diameter (ID) of the small bore inner surface 237' so as to provide the desired frictional resistance to rotation. Further, as described further below, the depth of the small bore 236' may be constructed so as to correspond substantially with (or be slightly less than) the depth of the hinge pin 279'. Further, the pin assembly 250 may also provide desired frictional resistance to rotation, as described below.

Figure 14:
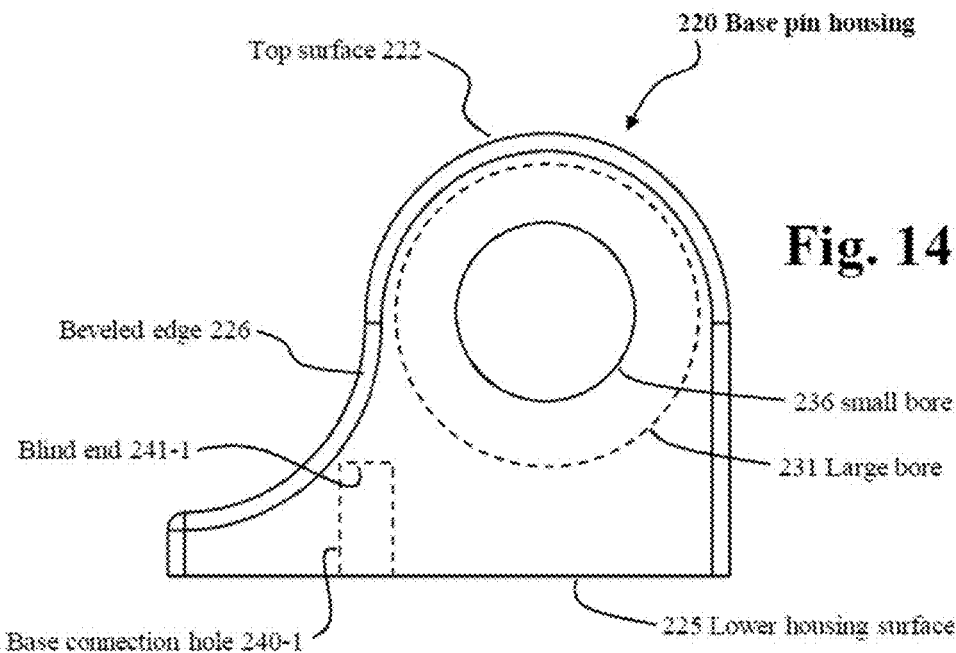
FIG. 14 is a side view of the base pin housing of FIG. 1, in accordance with one embodiment of the invention.

FIG. 14 is a side view of the base pin housing 220 of FIG. 1, in accordance with one embodiment of the invention. Accordingly, the base pin housing 220 of FIG. 14 corresponds to the right base pin housing (220) of FIG. 1. Relatedly, FIG. 15 is a bottom view of the base pin housing 220 of FIG. 14, in accordance with one embodiment of the invention.

FIG. 14 shows various features of the base pin housing 220 in similar manner to the base pin housing 220' shown in FIG. 13. In particular, the base pin housing 220 of FIG. 14 includes a small bore 236. The small bore 236 frictionally engages with the hinge pin 279 (such hinge pin 279 shown in FIG. 4). Also, FIG. 14 shows a large bore 231 shown in phantom. The large bore 231 extends through a portion of the base pin housing 220. As described further below, in accordance with embodiments of the invention, the large bore 231 is provided to receive components of the pin assembly 250, such components including the lock nut 257, the spring washers 256, the flat washer 254, and the lock washer 253, in accordance with one embodiment of the invention.

FIG. 14 also shows a base connection hole 240-1, in accordance with one embodiment of the invention. As shown, the base connection hole 240-1 includes a blind end 241-1. A screw may be passed through a base plate mounting hole 214 (see FIG. 17 as described below) and threaded into the base connection hole 240-1 so as to secure the base pin housing 220 to the base plate 210. For example, self threading screws might be utilized to connect the base pin housings to the base plate 210. FIG. 14 shows beveled edge 226.

Figure 15:
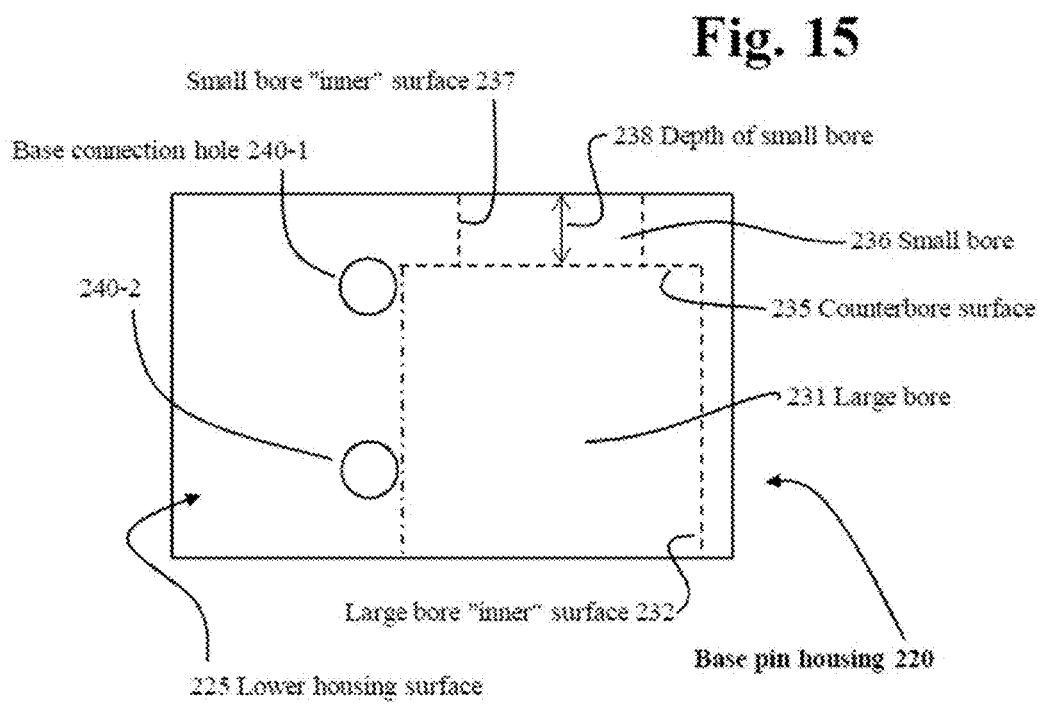
FIG. 15 is a bottom view of the base pin housing of FIG. 14, in accordance with one embodiment of the invention.

As shown in FIG. 15, the base pin housing 220 may include a second base connection hole 240-2. The two base connection holes (240-1, 240-2) provide a secure attachment of the base pin housing 222 to the base plate 210. Further, the base connection holes (240-1, 240-2) and corresponding base plate mounting holes 214 (see FIG. 17) maintain the orientation of the base pin housing 220 vis-à-vis the base plate 210. It is appreciated that the size of the base connection holes (240-1, 240-2), the size of the corresponding base plate mounting holes 214 (in the base plate 210), and the size of a screw, rivet, or other mechanical fastener used to connect such components may vary as desired. As an alternative to a mechanical attachment of the base pin housings 220, 220' to the base plates 210—it is appreciated that such components might be attached using a suitable adhesive or integrally formed, for example.

With further reference to FIG. 15, such drawing shows further detail of the small bore 236 of the base pin housing 220 vis-à-vis the large bore 231—and the interrelationship there between. As shown, the large bore 231 includes a large bore "inner" surface 232. The large bore 231 and the small bore 236 collectively form what may be characterized as a "counterbore" arrangement. Such "counterbore" arrangement includes a counterbore surface 235. The counterbore surface 235 constitutes the bottom of the large bore 231, which in turn is an enlargement of the small bore 236. The counterbore arrangement provides for a fastener, such as the fastener arrangement shown in FIG. 4 (lock washer 253, flat washer 254, spring washers 256, locknut 257) to be disposed within the large bore 231.

It is appreciated that the dimensions of the small bore 236 and the dimensions of the large bore 231 may be varied as desired. It may be desirable to construct the dimension of the large bore 231 so as to fully enclose the threaded bar 252 and associated lock washer 253, flat washer 254, spring washers 256, locknut 257.

Additionally, it may be desirable to construct the depth 238 (see FIG. 15) of the small bore 236 to be the same as or slightly less than the depth of the hinge pin 279 (see FIG. 10). Given such an arrangement, the locknut 257 and associated components may be tightened down on the hinge pin 279 without force being applied to the engagement of the hinge pin 279 vis-à-vis the small bore 236. That is, in the opposite case—with the depth 238 of the small bore 236 slightly greater than the depth of the hinge pin 279—such tightening may tend to create a clamping effect on the base pin housing 220. However, in some embodiments of the invention, such clamping effect might be desirable to assist in providing desired resistance to rotation.

Figure 16:
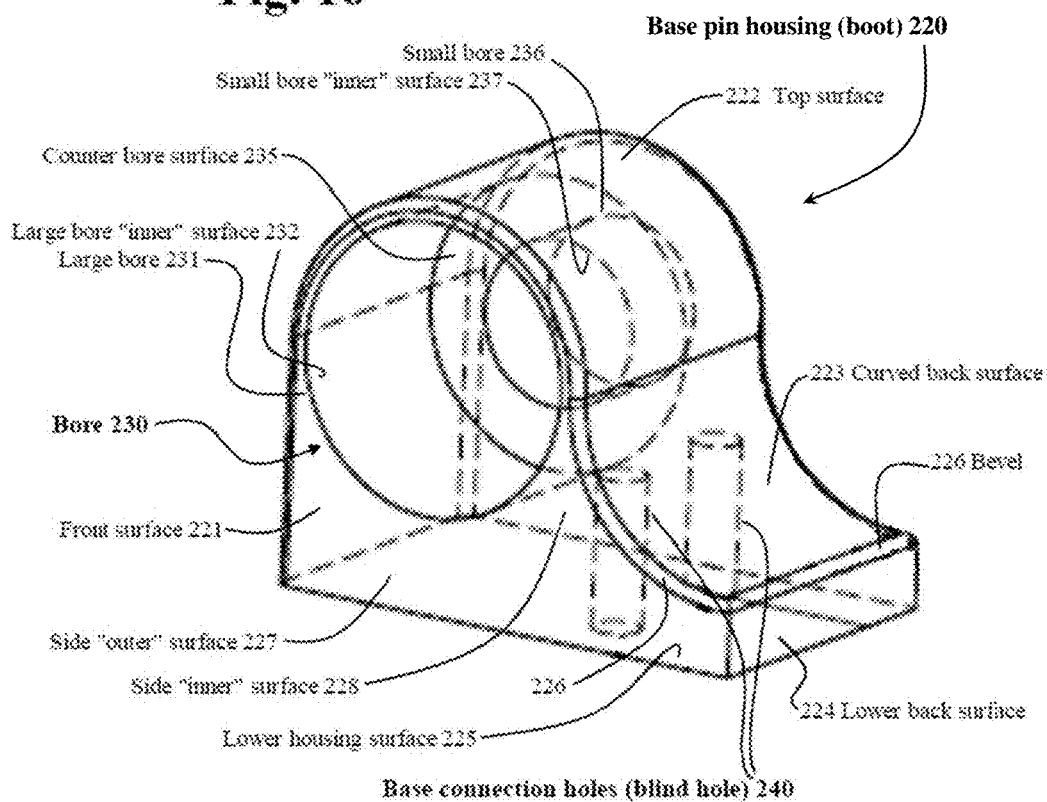
FIG. 16 is a perspective view in phantom of the base pin housing, in accordance with one embodiment of the invention.

FIG. 16 is a perspective view in phantom of the base pin housing 220, in accordance with one embodiment of the invention. Such drawing further illustrates the various features otherwise described herein. In particular, FIG. 16 further illustrates the "counterbore" arrangement including counterbore surface 235, large bore 231, and small bore 236.

As described above, the lock washer 253 (in each pin assembly 250) may be disposed so as to exert pressure on the counterbore surface 235) of the base pin housing 220. In accordance with embodiments of the invention, such interface between the pin assembly 250 (and in particular the lock washer 253 of the pin assembly 250) may be varied so as to control the rotational movement of the platform assembly 290 relative to the base plate 210. Such interface (i.e., the pressure of lock washer 253 on the counterbore surface 235) may be varied by tightening or loosening the lock nut 257 on the threaded bar 252, i.e., threaded rod 252. Such arrangement of the pressure of lock washer 253 on the counterbore surface 235 provides effective control of the rotational movement hand-in-hand with providing for smooth rotational adjustment by a user. FIG. 16 shows lower housing surface 225, bore 230, curved back surface 223, lower back surface 224, side "outer" surface 227, and side "inner" surface 228.

Figure 17:
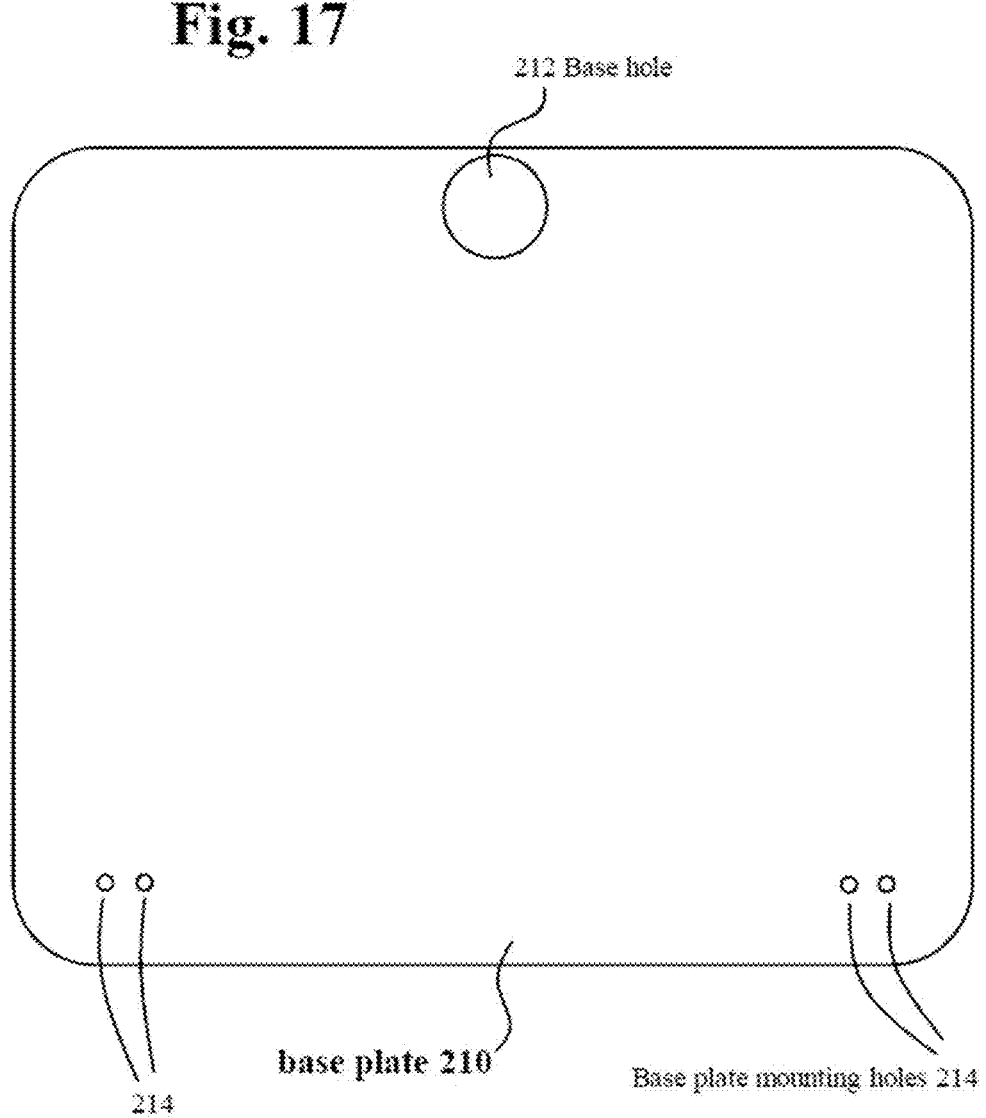
FIG. 17 is a top view of the base plate, in accordance with one embodiment of the invention.

FIG. 17 is a top view of the base plate 210, in accordance with one embodiment of the invention. As shown, the base plate 210 includes a plurality of base plate mounting holes 214 (described above) provided to receive a screw, for example, to attach the base plate 210 to the pair of base pin housings (220, 220'). As shown in FIG. 17, the base plate 210 also includes the base hole 212. The base hole 212 may be provided to assist a user in holding the base plate 210 and/or to assist in the mechanical attachment of the base plate 210 to some other structure, as may be desired.

Figure 18:
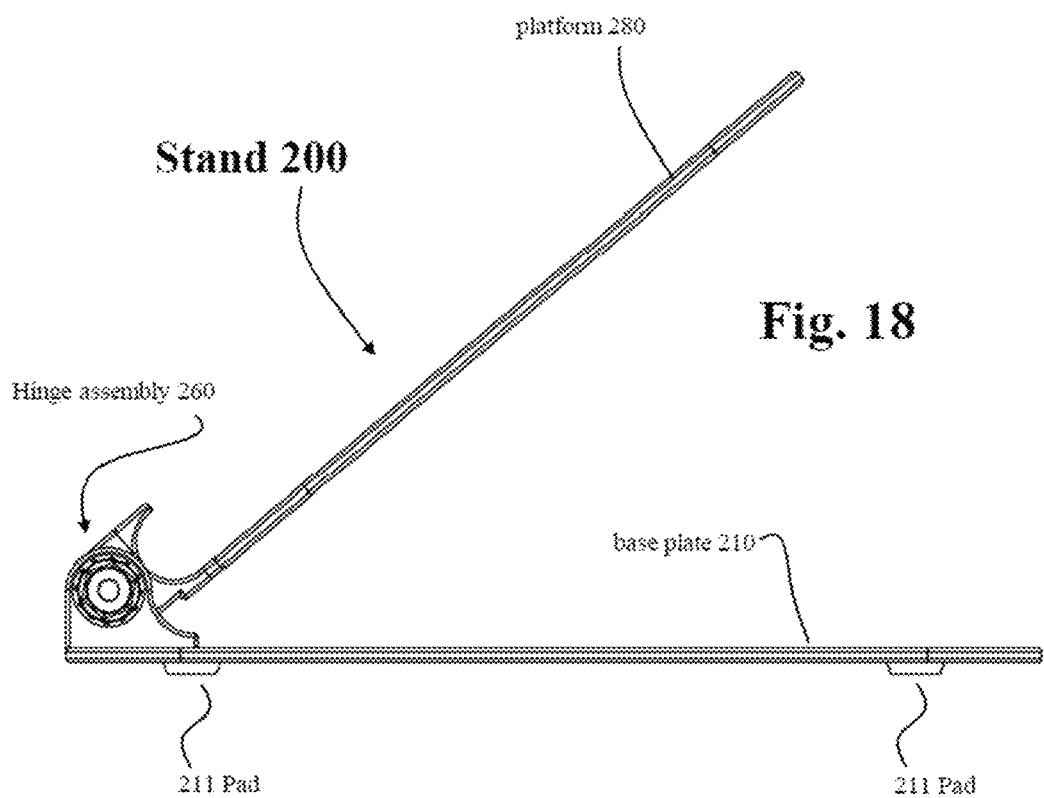
FIG. 18 is a side view of the stand of FIG. 1, in accordance with one embodiment of the invention.

FIG. 18 is a side view of the stand 200 of FIG. 1, in accordance with one embodiment of the invention. As shown, the platform 280 is in a raised position at approximately 40 degrees above the base plate 210. As otherwise described herein, it is appreciated that the angle at which the platform 280 is disposed may be adjusted as desired, i.e., as limited by the structure of the stand. FIG. 18 also reflects that pads 211 may be attached to the bottom of the base plate 210. For example, the pads 211 might be plastic and/or rubber so as to protect a surface upon which the stand is disposed and/or to resist the stand 200 sliding on a supporting surface. The pads 211 may be attached to the base plate 210 in any suitable manner, such as through mechanical attachment and/or using adhesive, for example.

FIG. 19 is a perspective view of a stand 200 in a closed, stowed arrangement, in accordance with one embodiment of the invention. It is appreciated that the stand 200 might well be used in the arrangement shown in FIG. 19, such as to support a tablet computer, for example.

Figure 20:
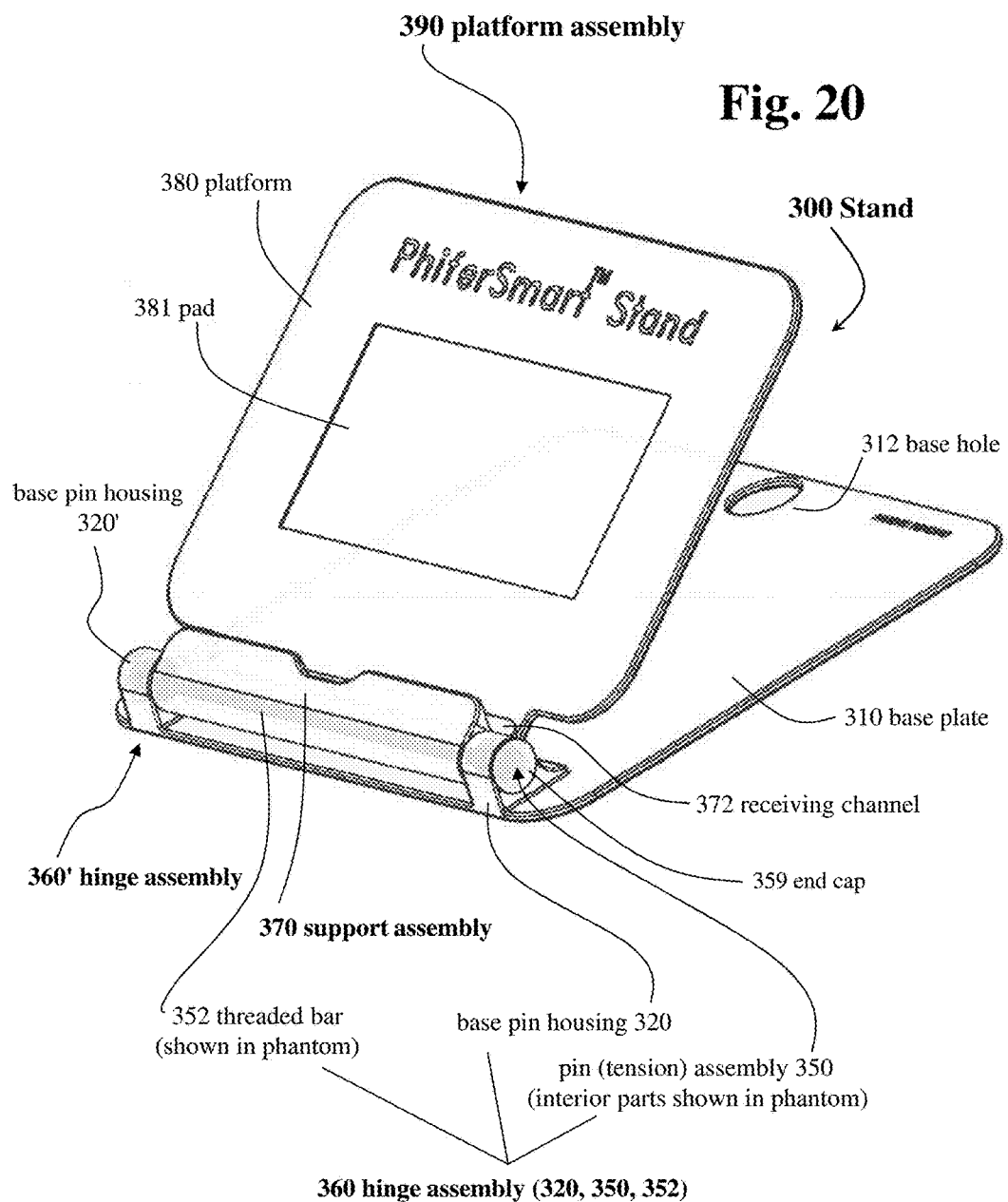
FIG. 20 is a perspective view showing various details of a stand, in accordance with a further embodiment of the invention

FIG. 20 is a perspective view showing various details of a stand, in accordance with a further embodiment of the invention. While generally similar to the structure of the stand shown in FIG. 1 and described above, various aspects of the stand of FIG. 20 are different in structure. As shown, the stand 300 includes a platform assembly 390, a base plate 310 and a hinge assembly 360. More specifically, the platform assembly 390 includes a platform 380 and a support assembly 370. As described further below, the platform 380 and the support assembly 370 may be integrally formed, or alternatively, may be formed separately (as 2 separate pieces) and mechanically connected together in some suitable manner. The platform 380 includes a pad 381. As described above, the pad 31 may be constructed of various material as desired so as to, for example, prevent slipping of an item resting upon the platform 380 and/or provide a suitable surface for writing upon the platform 380. The support assembly 370, as shown in FIG. 20, includes a receiving channel 372. The receiving channel 372 provides a concave surface upon which a supported item may be rested and secured.

The base plate 310 may include a base hole 312 by which a user may hold onto the stand 300 and/or by which the stand 300 may be attached in some manner.

As noted above, the stand 300 further includes a hinge assembly 360. The hinge assembly 360 includes a pin (tension) assembly 350 (of which interior parts are shown in phantom in FIG. 20), a threaded bar 352 (that may be characterized as being a part of the pin assembly 350), and base pin housings 320, 320'. As noted above, the base pin housings 320, 320' may be integrally formed with the base plate 310. As described in detail below, the threaded bar 352 may extend the width, i.e. the length across, of the support assembly 370. Suitable fastening mechanisms, such as a nut and washers, may be utilized to thread onto an end of the threaded bar 352—so as to secure each side of the support assembly 372 to a respective base pin housing 320, 320'. Further details are described below. As shown in FIG. 20, the pin assembly 350 further includes an end cap 359. The end cap 359 serves to cover interior components of the pin assembly 350.

The pin assembly 350 may be characterized as a "pin (tension) assembly" in that the threaded bar 352 is utilized in a tensile state effectively clamping a portion of the base pin housing 320, 320' between a nut (nut 357 described below), for example, mounted upon the threaded bore 352 and an end of the support assembly 370. Such clamping disposition may be adjusted through the tightening or loosening of the nut. The adjustment of such clamping disposition adjusts the pressure needed to rotate the platform assembly 390 to a different angular position, i.e. vis-à-vis the base plate 310.

Figure 21:
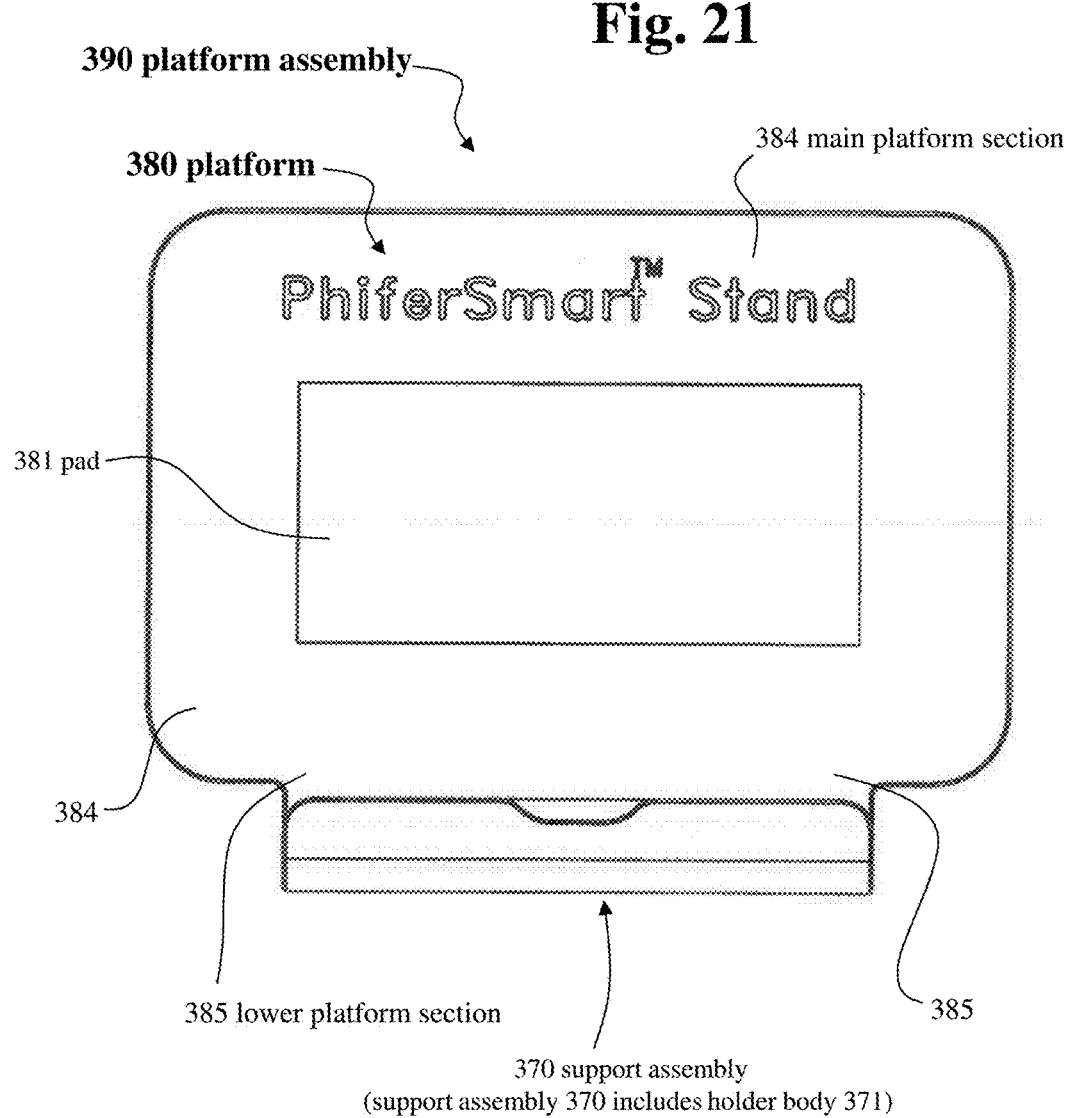
FIG. 21 is a front view of the platform assembly of FIG. 20, in accordance with one embodiment of the invention.

FIG. 21 is a front view of the platform assembly of FIG. 20, in accordance with one embodiment of the invention. As shown, the width of the support assembly 370 may be narrower than the width of the platform 380. However, it is appreciated that the particular dimensions used may vary as desired. For example, the support assembly 370 might be constructed having the same width as the platform 380. Accordingly, such might result in the width of the base plate 310 being increased. FIG. 21 shows main platform section 384 and lower platform section 385.

Figure 22:
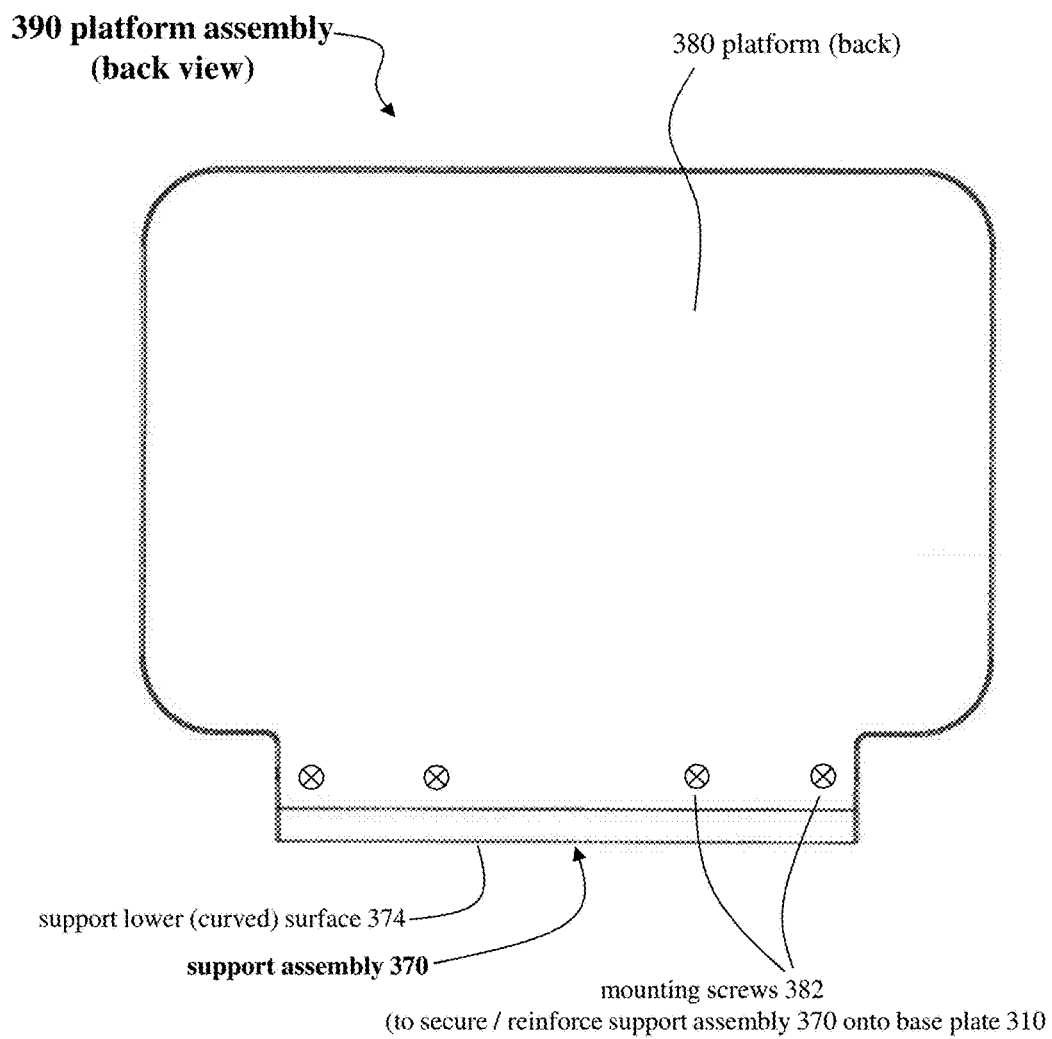
FIG. 22 is a back view of the platform assembly of FIG. 20, in accordance with one embodiment of the invention.

FIG. 22 is a back view of the platform assembly 390 of FIG. 20, in accordance with one embodiment of the invention. As shown, the platform assembly 390 includes the platform 380 and the support assembly 370. More specifically, in the arrangement of FIG. 22, a support lower surface 374 (of the support assembly 370) extends below the platform 380. It is appreciated that mounting screws 382 may be utilized to connect the support assembly 370 to the platform 380 and/or reinforce the structure in some manner. This is of course in particular true if the support assembly 370 is not integrally formed with the platform 380. In the situation that the support assembly 370 is integrally formed with the platform 380, then screws 382 may well not be needed.

Figure 23:
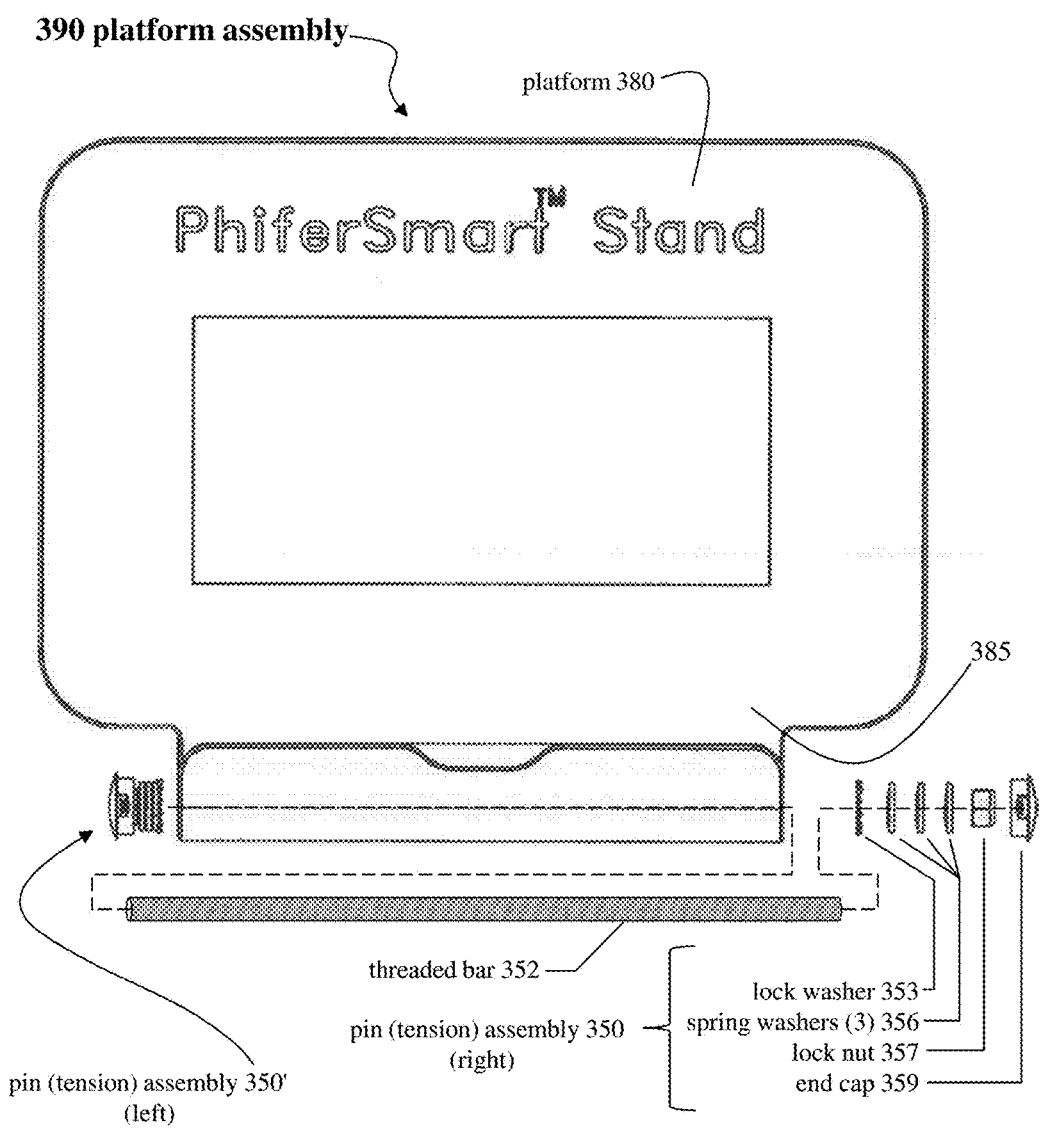
FIG. 23 is an exploded view of the platform assembly of FIG. 20, in accordance with one embodiment of the invention.

FIG. 23 is an exploded view of the platform assembly of FIG. 20, in accordance with one embodiment of the invention. In particular, FIG. 23 shows further details of the pin assembly 350 on the right-hand side of FIG. 23 and the pin assembly 350' on the left side of FIG. 23. The pin assembly 350, in the example of FIG. 23, includes a lock washer 353, a plurality of spring washers 356, and a lock nut 357. The lock nut 357 is threaded upon the threaded bar 352 such that one may tighten or loosen the lock nut 357 on the threaded bar 352—and as a result vary the ease by which the platform assembly 390 is angularly moved upon the base plate 310. In accordance with an embodiment of the invention, each pin assembly 350 may be characterized to include a portion of the threaded bar 352, i.e. a corresponding distal end section of the threaded bar 352. Further aspects are described below with reference to FIG. 24A and FIG. 24B. In this manner, each pin assembly 350 includes a respective portion of the threaded bar 352—though such respective portions may be adjoined together. As shown in FIG. 23, an end cap 359 may be provided to contain and cover the lock nut 357 and other mechanical fasteners. As further described below, the end cap 359 may be fitted and secured within an opening in the base pin housing 320.

In general, it is submitted that description of a feature on a particular side (of a stand described herein) may be taken as description of both sides if such feature exists on both sides, or if mirror images of such feature exists on both sides. Accordingly, for example, a description of the pin assembly 350 of FIG. 23 may be taken as a description of pin assembly 350'.

Figure 24A:
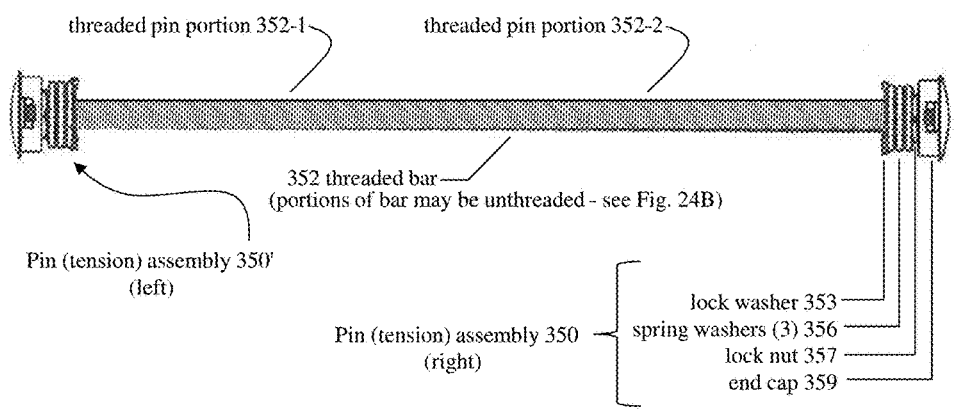
FIG. 24A is a front view of pin assemblies with a threaded bar in accordance with one embodiment of the invention.

FIG. 24A is a front view of pin assemblies with a threaded bar in accordance with one embodiment of the invention. As shown in FIG. 24A the threaded bar 352 may include a threaded pin portion 352-1 and a threaded pin portion 352-2. Accordingly, the threaded pin portion 352-1 may be characterized as being included and a part of the pin assembly 350'. On the other hand, the threaded pin portion 352-2 may be characterized as being included and a part of the pin assembly 350.

Figure 24B:
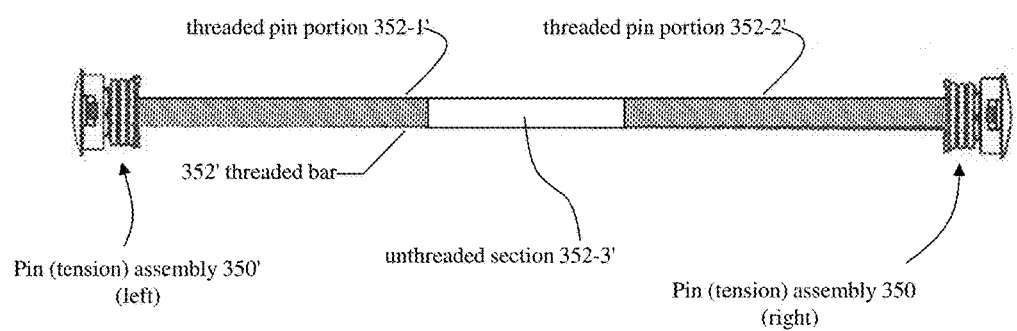
FIG. 24B is a front view of pin assemblies with a threaded bar in accordance with a further embodiment of the invention.

FIG. 24B is a front view of pin assemblies (350, 350') with a threaded bar in accordance with a further embodiment of the invention. As shown in FIG. 24B the threaded bar 352' may include a threaded pin portion 352-1' and a threaded pin portion 352-2'. Accordingly, the threaded pin portion 352-1 may be characterized as being included and a part of the pin assembly 350'. On the other hand, the threaded pin portion 352-2 may be characterized as being included and a part of the pin assembly 350. In contrast to the threaded bar 352 of FIG. 24A, the threaded bar 352' of FIG. 24B is not threaded along the length of the threaded bar 352'. As shown, the threaded bar 352' includes an unthreaded section 352-3'. It is appreciated that the length of the unthreaded section vis-à-vis the lengths of the two threaded sections may vary as desired. A threaded bar, as described herein, may be in the form of a threaded rod or other similar mechanical structure.

Figure 25:
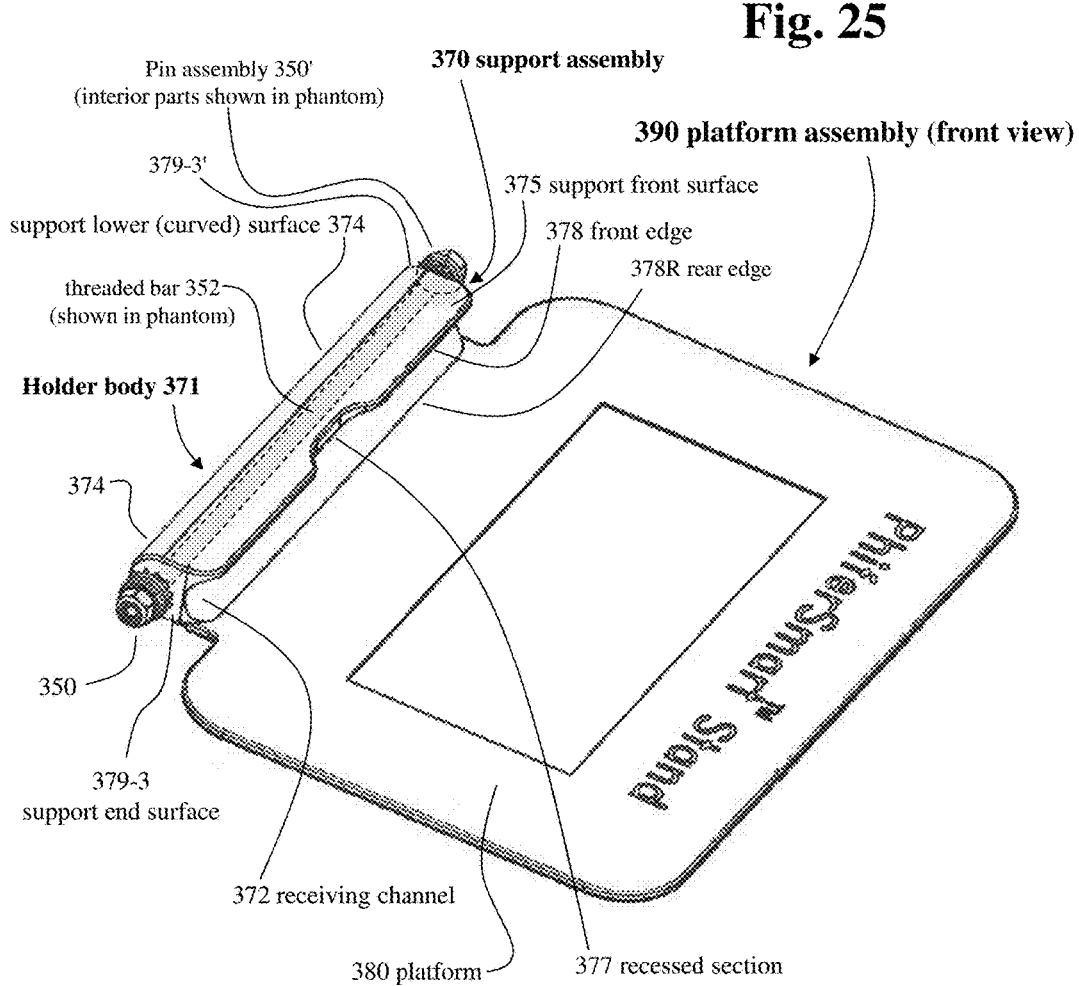
FIG. 25 is a perspective view of a platform assembly with support assembly with pin assemblies, in accordance with one embodiment of the invention.

FIG. 25 is a perspective view of a support assembly with pin assemblies (350, 350'), in accordance with one embodiment of the invention. In particular, the platform assembly 390 is shown including a platform 380 and a support assembly 370. The support assembly 370 includes a holder body 371. As described hereinafter, the structure of the holder body 371 may be provided to house a threaded bar 352 (passing through the holder body 371 and shown in phantom in FIG. 25 for example), as well as to support an item resting both on the holder body 371 and the platform 380.

More specifically, as shown in FIG. 25, the holder body 371 includes a receiving channel 372. The receiving channel 372 is concave in design so as to beneficially support an item, such as a cell phone or other electronic device, for example, in similar manner to the stand 200 described above. The holder body 371 also includes a support lower surface 374. As shown, the support lower surface 374 may be curved. Such curved arrangement provides for the support assembly 370 to be positioned proximate the base plate 310 and to be rotatable in such proximate disposition. In other words, the curved nature of the support lower surface 374 provides for clearance of the support assembly 370 as it is rotated relative to the base plate 310. As shown, the holder body 371 further includes a support end surface 379-3, 379-3' disposed at each end of the holder body 371. It is the support end surfaces 379-3, 379-3' vis-à-vis the nuts/washers (of each pin assembly) that clamp a respective base pin housing 320, 320' there between, i.e. so as to resist rotational movement as desired. The holder body 371, as shown in FIG. 25, includes a support front surface 375. At an upper edge of the support front surface 375, and along the length of the holder body 371, extends a front edge 378. The front edge 378 may be provided with a recessed section 377 as described herein. Further, the holder body 371 may include a rear edge 378R. The rear edge 378R may delineate a rearward extent of the receiving channel 372.

Figure 26:
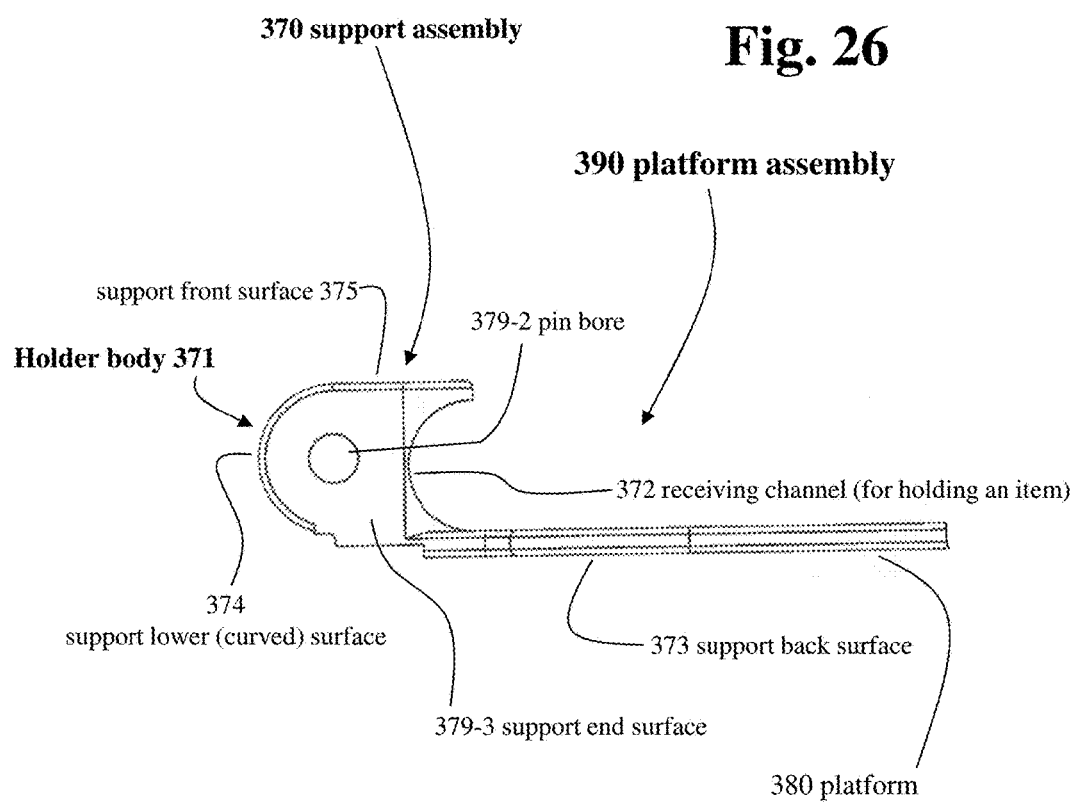
FIG. 26 is an end view of a platform assembly with support assembly with holder body, in accordance with one embodiment of the invention.

FIG. 26 is an end view of a platform assembly 390 and support assembly, in accordance with one embodiment of the invention. As shown, the support assembly 370 (of FIG. 26) includes a holder body 371. The holder body 371 includes a support lower surface 374, as described above, which may be curved as shown. The holder body 371 also includes a support front surface 375. The support end surface 379-3 (described above) is shown in further detail including the pin bore 379-2. FIG. 26 also shows further aspects of the platform 380 that includes a support back surface 373. FIG. 26 more clearly shows, in accordance with one embodiment, the integral construction of the holder body 371 with the platform 380. However, it is appreciated that the holder body 371 and the platform 380 may be separately constructed and attached together in some suitable manner, such as through the use of screws.

Figure 27:
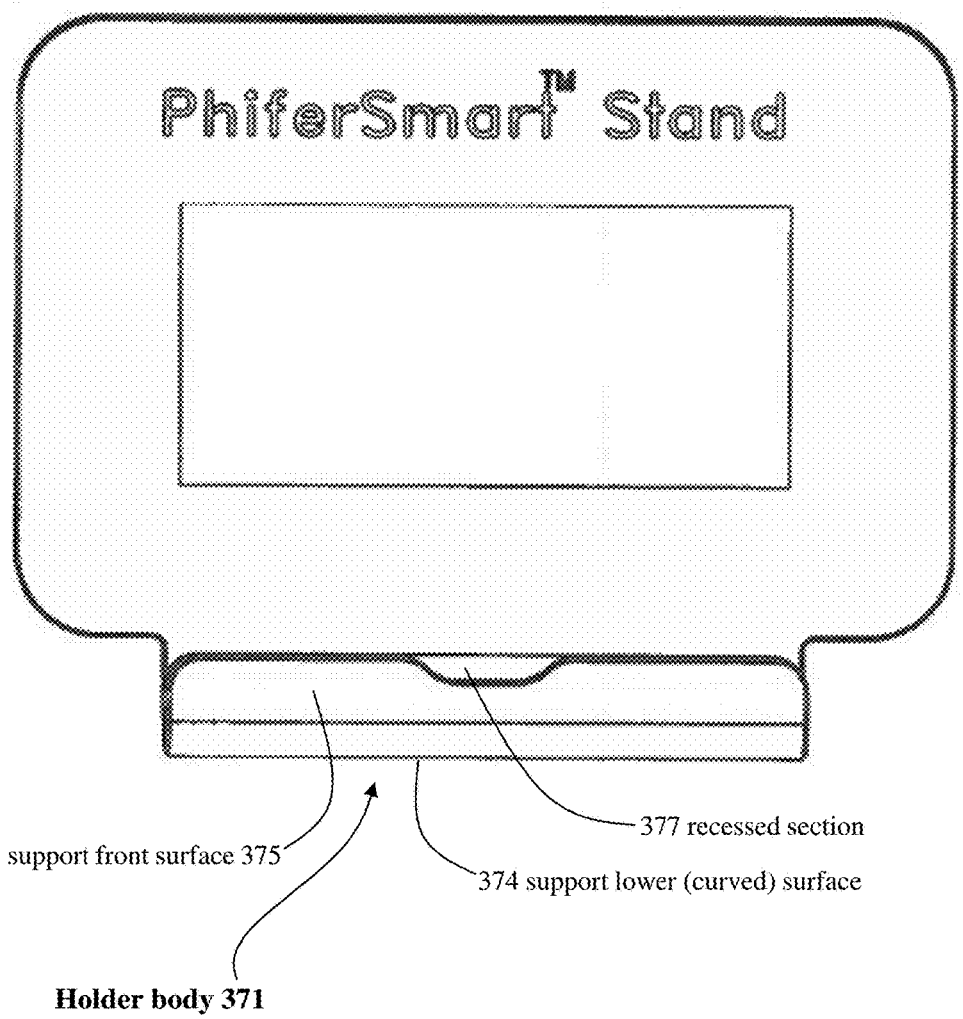
FIG. 27 is a front view of a platform assembly with support assembly with holder body, in accordance with one embodiment of the invention.

FIG. 27 is a front view of a platform assembly 390 with holder body, in accordance with one embodiment of the invention. In particular, FIG. 27 shows the recessed section 377 disposed in the holder body 371. The particular size and/or dimensions of the recessed section 377 may vary as desired. The recessed section 377 may assist a user in removing an object (such as a phone) from being supported upon the support assembly 370.

Figure 28:
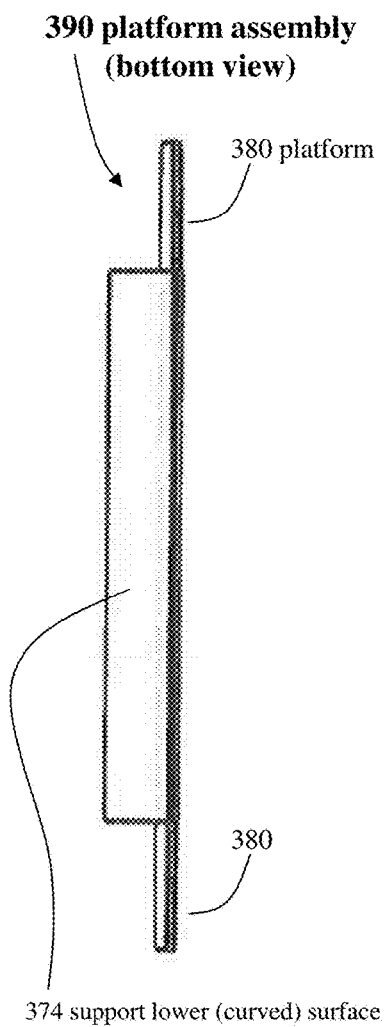
FIG. 28 is a bottom view of a platform assembly with support assembly, in accordance with one embodiment of the invention.

FIG. 28 is a bottom view of a support assembly, in accordance with one embodiment of the invention.

Figure 29:
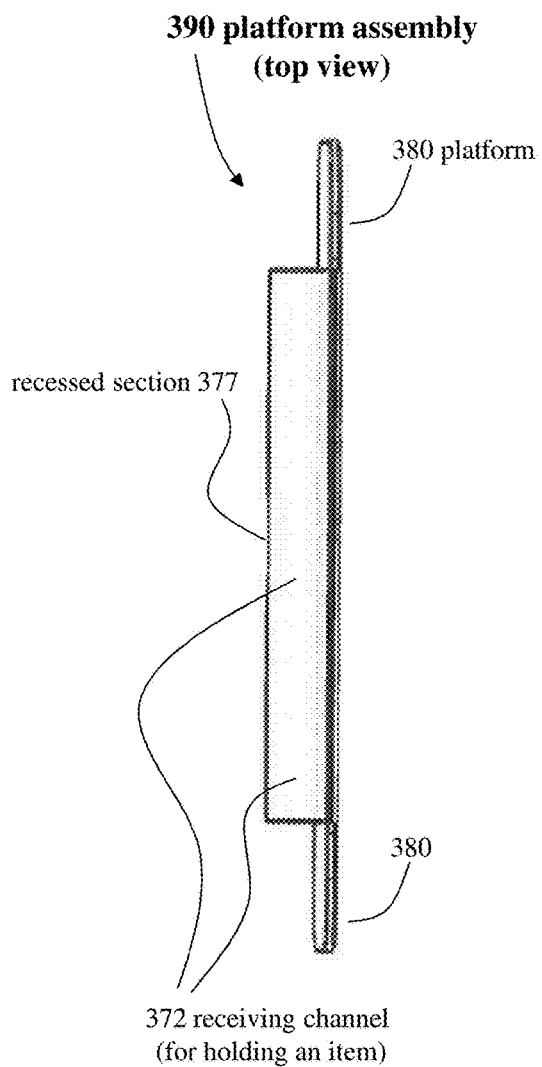
FIG. 29 is a top view of a platform assembly with support assembly, in accordance with one embodiment of the invention.

FIG. 29 is a top view of a support assembly, in accordance with one embodiment of the invention.

Figure 30:
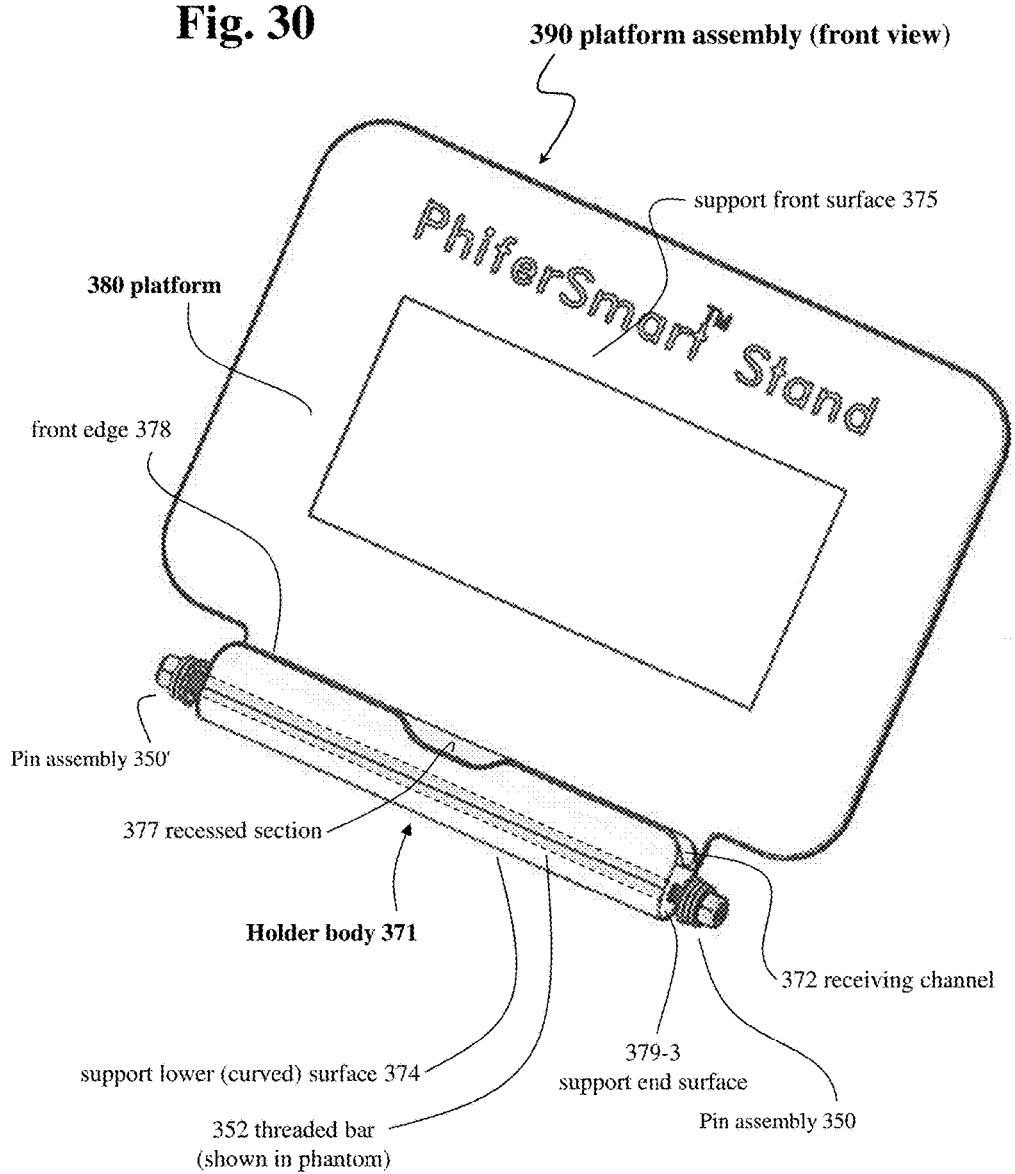
FIG. 30 shows further detail of a platform assembly with support assembly (including holder body), in accordance with an embodiment of the invention.

FIG. 30 shows further detail of a support assembly with holder body, in accordance with embodiments of the invention.

Figure 31:
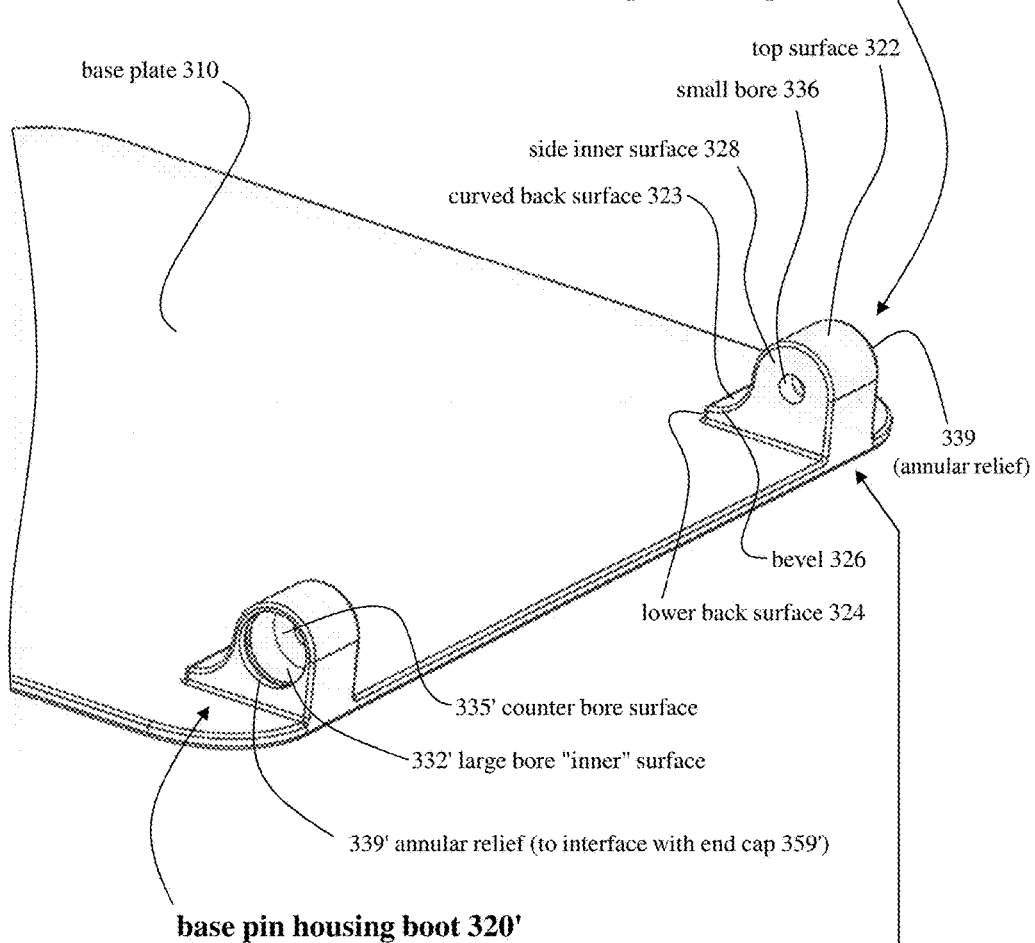
FIG. 31 is a perspective view of a base plate with base pin housing boots, in accordance with one embodiment of the invention.

FIG. 31 is a perspective view of a base plate with base pin housing boots, in accordance with one embodiment of the invention. FIG. 31, in particular, shows further detail of the base pin housing boots 320, 320'. For example, the base pin housing boot 320 may include a small bore 336 through which a threaded bar 352 passes, as described above. Further, the base pin housing boot 320 may include a large bore "inner" surface 332 which serves to house a pin assembly 350. Relatedly, the base pin housing boot 320 includes a counter bore surface 335 upon which a lock nut 357 and associated washers, for example, may be tightened upon. That is, it is the counter bore surface 335 and a side inner surface 328 upon which the pin assembly 350 is tightened—so as to restrict rotational movement of the platform 380 about the base plate 310. FIG. 31 shows top surface 322 on base pin housing boot 320. FIG. 31 shows counter bore surface 335', large bore "inner" surface 332', and annular relief 339' (to interface with end cap 359').

Further, the base pin housing boot 320 may include an annular relief 339. The annular relief 339 may accept and interface with a corresponding end cap 359 (see FIG. 20 for example). In this manner, each end cap 359 may be "sunken" into a base pin housing boot so as to be more athletically pleasing and so as to be less likely to catch on items. As shown, the base pin housing boot 320 further includes a curved back surface 323 and a lower back surface 324. The various surfaces of the base pin housing boot 320 may be provided with bevels, such as the bevel 326. As shown in FIG. 31, each of the base pin housing boots 320, 320' may be integrally formed with the base plate 310.

Figure 32:
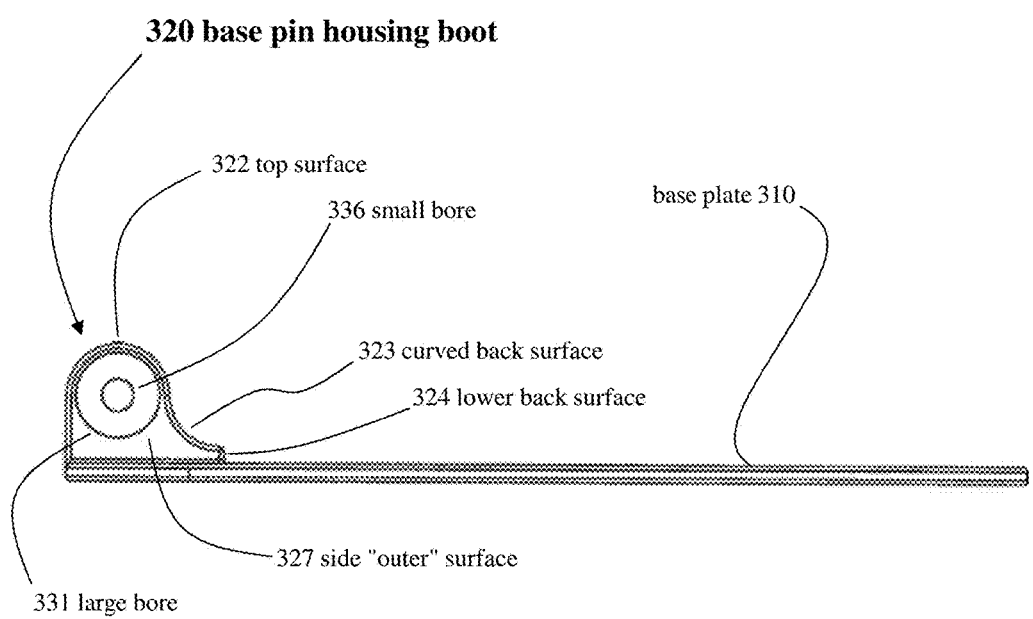
FIG. 32 is a side view of the base plate with base pin housing boots of FIG. 31, in accordance with one embodiment of the invention.

FIG. 32 is a side view of the base plate with base pin housing boots of FIG. 31, in accordance with one embodiment of the invention. In particular, FIG. 32 shows large bore 331 and small bore 336 disposed in the base pin housing boot 320. As shown, the base pin housing boot 320 provides a sound structure in conjunction with a pleasing aesthetic appearance. FIG. 32 shows side "outer" surface 327.

Figure 33:
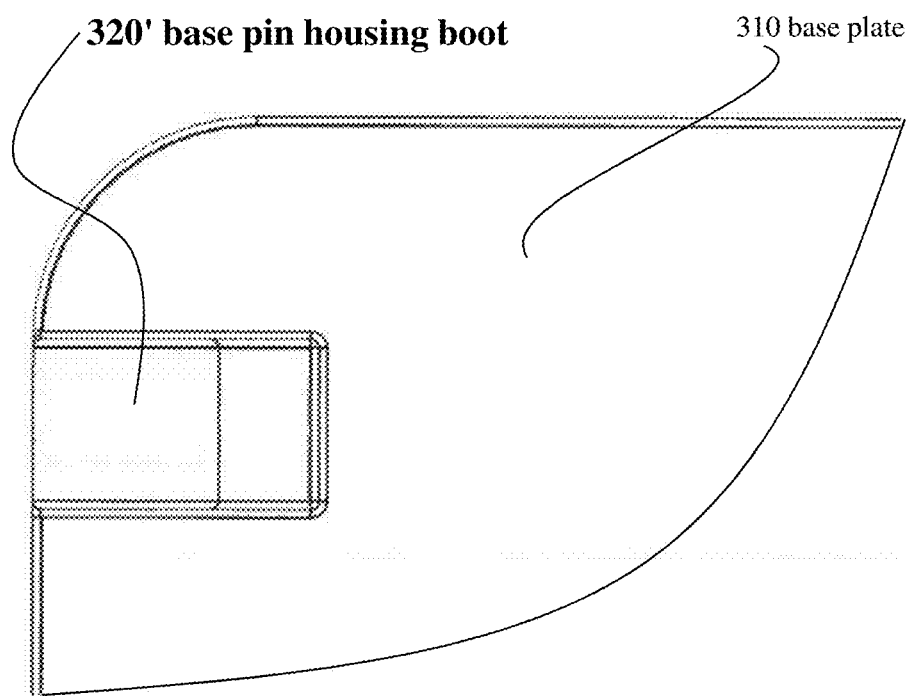
FIG. 33 is a partial top view of the base plate with base pin housing boot of FIG. 31, in accordance with one embodiment of the invention.

FIG. 33 is a partial top view of the base plate with base pin housing boot of FIG. 31, in accordance with one embodiment of the invention.

Figure 34:
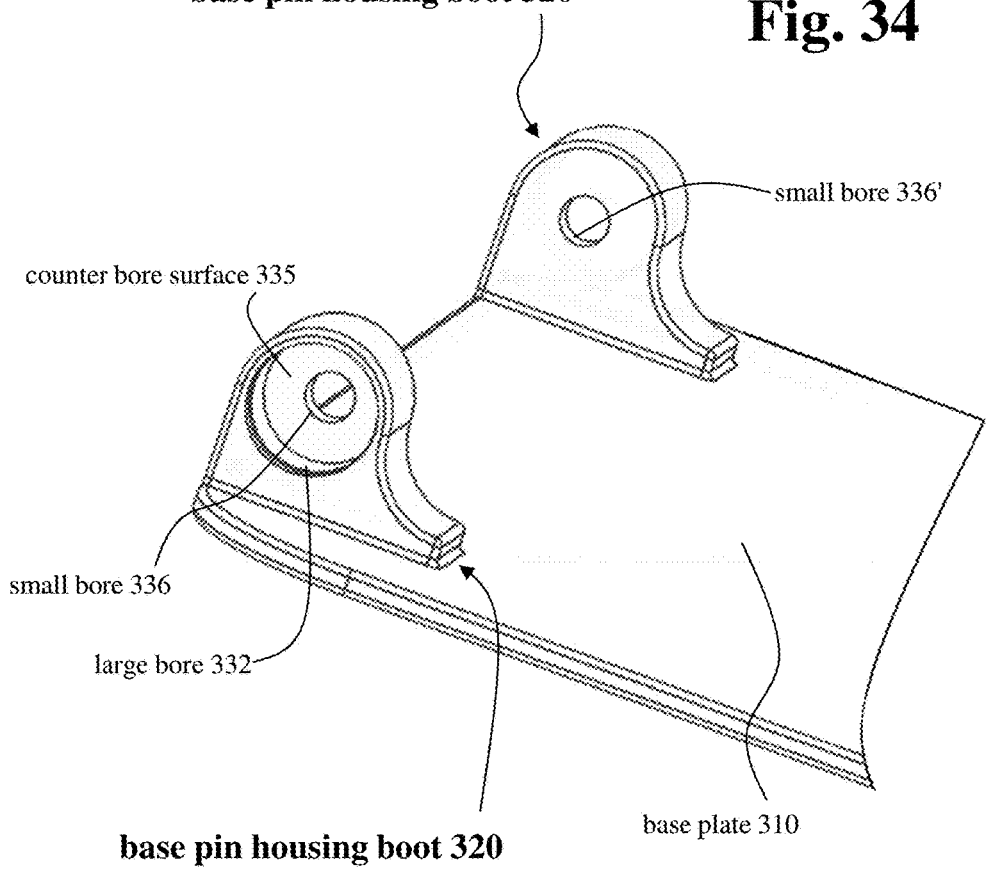
FIG. 34 is a further perspective view of a base plate with base pin housing boots, in accordance with one embodiment of the invention.

FIG. 34 is a further perspective view of a base plate with two base pin housing boots 320, 320', in accordance with one embodiment of the invention. In particular, with the perspective of FIG. 34, details of the base pin housing boot including the small bore 336 and large bore 332 are further illustrated. It is appreciated that the particular dimensions of the small bore 336, the large bore 332 and the counter bore surface 335 may vary as desired. Such variance may well depend on the particular hardware utilized for the pin assembly 350, 350', the diameter of the threaded bar 352, the durability required of the stand, and/or other parameters and attributes.

Figure 35:
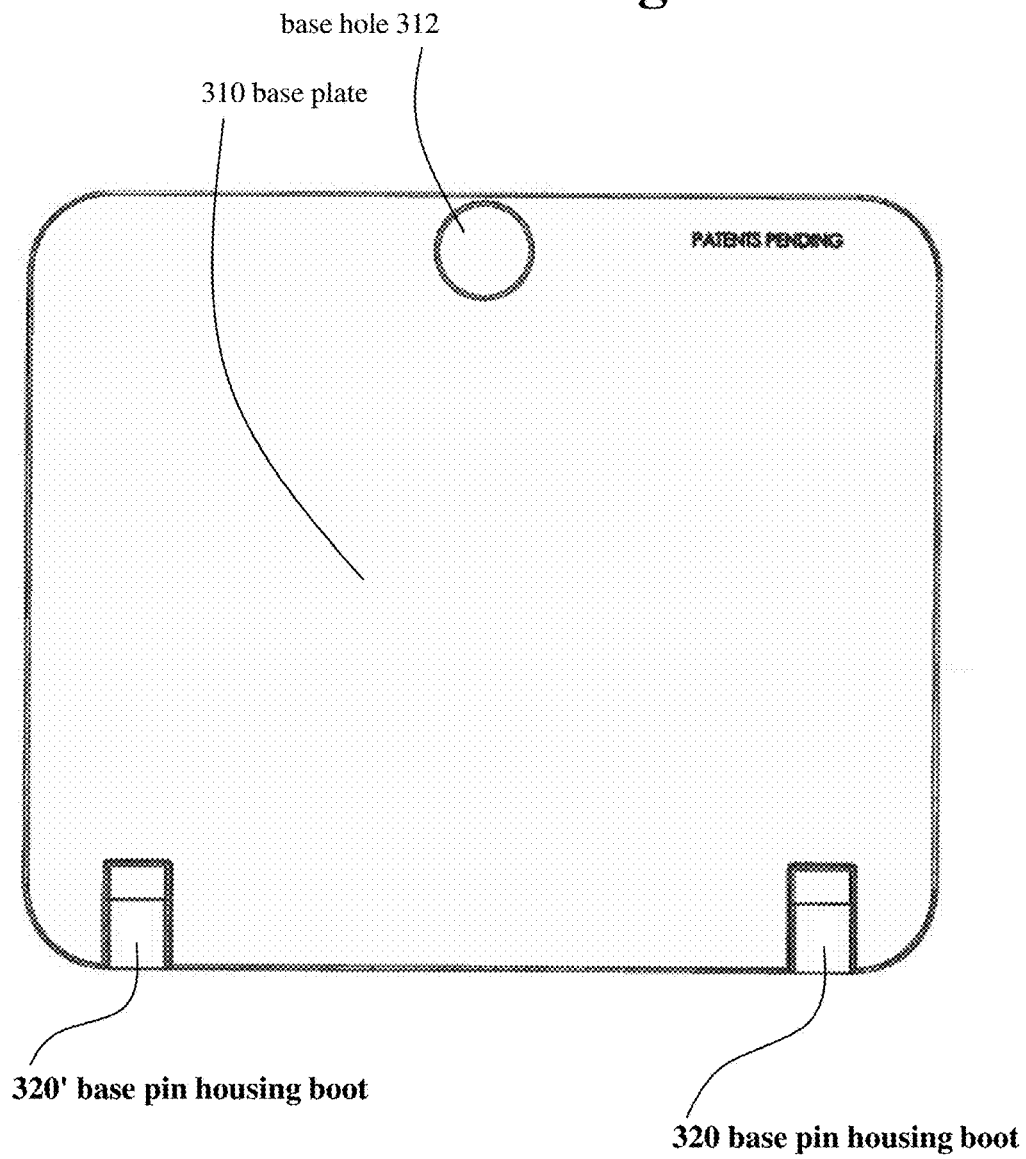
FIG. 35 is a further top view of the base plate with two base pin housing boots of FIG. 31, in accordance with one embodiment of the invention.

FIG. 35 is a further top view of the base plate with two base pin housing boots of FIG. 31, in accordance with one embodiment of the invention.

Figure 36:
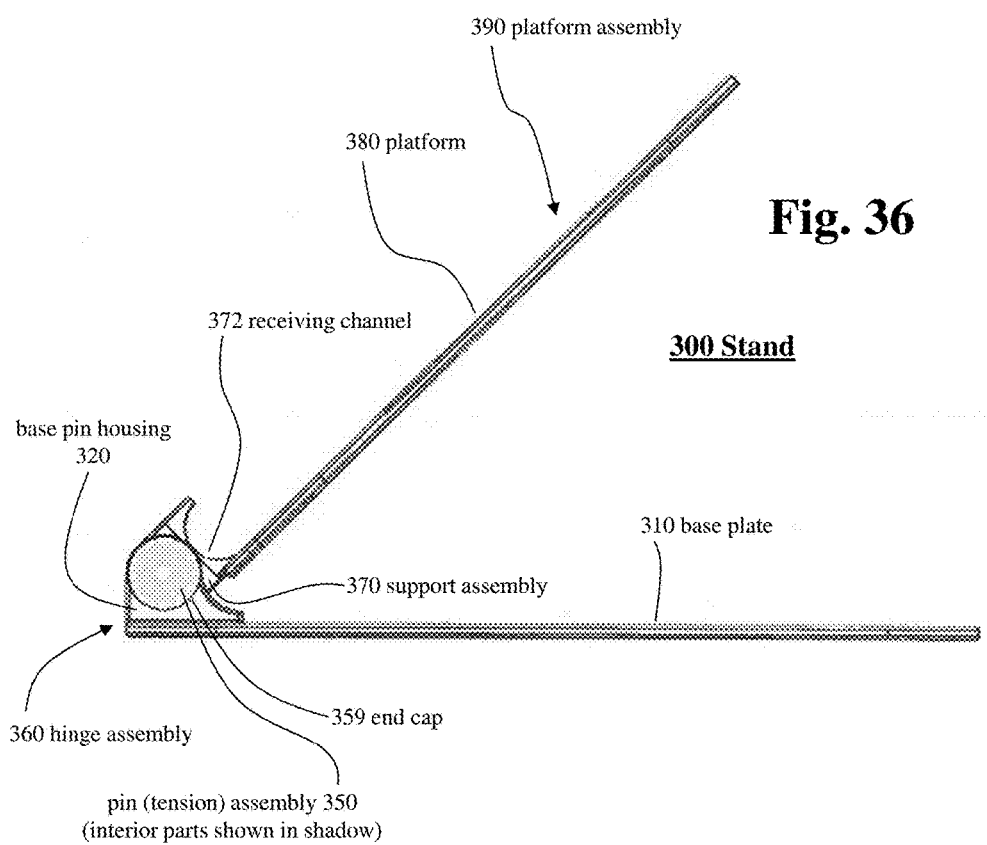
FIG. 36 is a side view of the stand of FIG. 20, in accordance with one embodiment of the invention.

FIG. 36 is a side view of the stand 300 of FIG. 20, in accordance with one embodiment of the invention.

Figure 37:
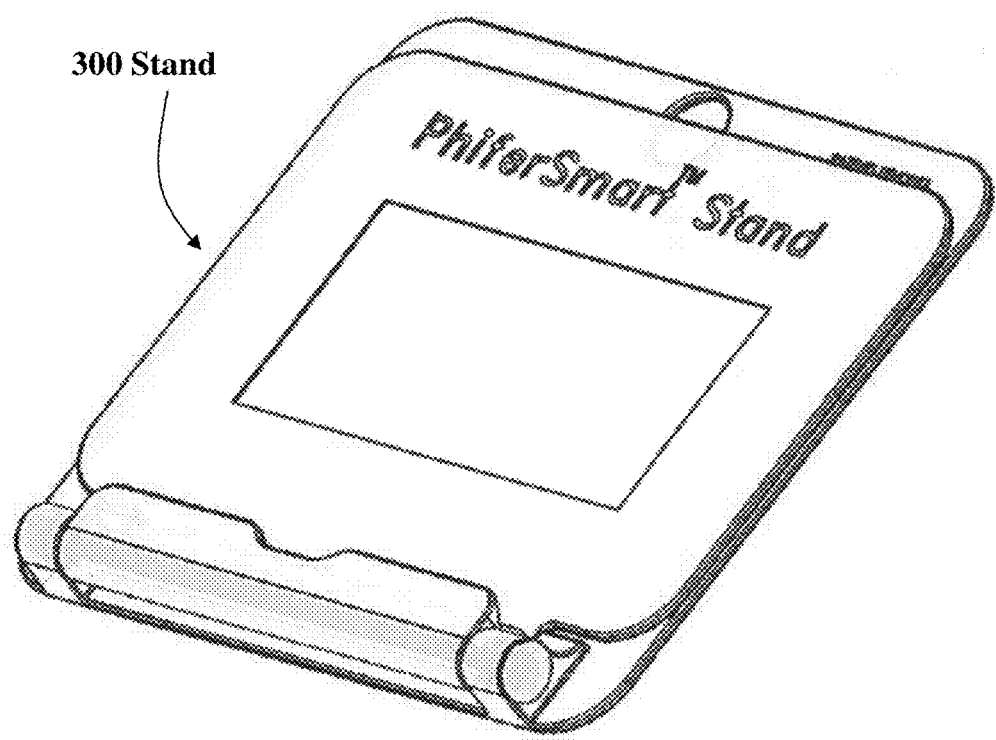
FIG. 37 is a perspective view of the stand (of FIG. 20) in a closed, stowed arrangement, in accordance with one embodiment of the invention.

Lastly, FIG. 37 is a perspective view of the stand (of FIG. 20) in a closed, stowed arrangement, in accordance with one embodiment of the invention.

It is appreciated that various embodiments are described herein. It is appreciated that a particular feature of a particular embodiment described herein might be utilized in other embodiments described herein, as desired. Accordingly, for example, a particular feature described in the context of the stand 200 of FIG. 1 may be utilized in the context of the stand 300 of FIG. 20 and vice versa.

As described above, the device of the invention in accordance with the various embodiments may be made from any of a wide variety of materials, as desired. For example, one embodiment of the stand is made of plastic. However, the invention, in whole or in part, might be made of wood, plastic, metal, ceramic, cloth or rubber, for example, or any other material, as desired.

The stand 200 may be used to support any of a wide variety of personal electronic devices, or other items, and is not limited to those described herein. Accordingly, the stand 200 may be used to support an electronic tablet computer, a cell phone, other telephone, personal digital assistant (PDA), calculator, monitor, remote control unit, or other personal electronic device, or any other item, such as a writing pad, recipe card, document, or book, for example.

In conclusion, it will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A stand for holding an item, the stand comprising:
   a base plate provided to support the stand;
   a plurality of hinge assemblies connected to the base plate; and
   a platform assembly pivotally connected to the hinge assemblies and supported by the hinge assemblies, such that the angular disposition of the platform assembly is adjustable relative to the base plate, the platform assembly including:
      a main platform section that includes a lower platform section disposed along a lower edge of the main platform section; and
      a support assembly connected to the lower platform section, the support assembly having opposing ends, and the support assembly pivotally connected to a respective hinge assembly, of the plurality of hinge assemblies, at each such end of the support assembly; and
   each hinge assembly including:
      a base pin housing that includes a bore, the base pin housing mounted upon the base plate, and
      a pin assembly that includes a pin portion, the pin portion extending out from an end, of the opposing ends, of the support assembly and into a respective bore of the base pin housing, and such that two opposing pin portions are provided that respectively extend out from an opposing end, of the opposing ends, of the support assembly to be supported by and secured within respective base pin housings; and the pin assembly at each end of the support assembly being frictionally engaged within a respective base pin housing, of the base pin housings, such frictional engagement providing resistance to rotation of the support assembly relative to each base pin housing; and the support assembly including an elongated structure extending along a length of the support assembly, the elongated structure to support a lower edge of an item resting upon the elongated structure in conjunction with the item also resting upon the main platform section.

2. The stand of claim 1, each pin portion is threaded, and each pin assembly further including a fastener that engages with the threaded pin portion to secure each pin portion to a respective base pin housing, of the base pin housings.

3. The stand of claim 2, wherein at least a portion of each base pin housing is secured between a respective end, of the opposing ends, of the support assembly and a respective fastener, of the fasteners.

4. The stand of claim 3, wherein each fastener is a nut.

5. The stand of claim 4, each fastener constituted by a lock nut and a plurality of washers.

6. The stand of claim 5, the plurality of washers is constituted by a lock washer and at least one spring washer.

7. The stand of claim 1, wherein each pin portion extending into the support assembly less than half the length of the support assembly.

8. The stand of claim 1, each pin portion constituting a section of a threaded bar, the threaded bar extending the length of the support assembly.

9. The stand of claim 8, the threaded bar including an unthreaded section that is disposed in a middle of the threaded bar.

10. The stand of claim 1, each pin portion including a threaded bar that is threadably disposed within each end of the support assembly, and a securement mechanism disposed on each threaded bar in such manner that each threaded bar is retained relative to the base pin housing in which the respective threaded bar is retained.

11. The stand of claim 10, the securement mechanism is a lock nut.

12. The stand of claim 10, each base pin housing comprising a counterbore arrangement, the counterbore arrangement including:
a small bore to frictionally engage a respective hinge knob disposed on each end, of the opposing ends, of the support assembly;
a large bore to enclose a respective pin assembly, of the pin assemblies.

13. The stand of claim 1, each base pin housing secured to the base plate via screws.

14. The stand of claim 1, the base plate including a base hole to assist in securing the base plate.

15. The stand of claim 1, the stand adapted to hold an electronic device or a document.

16. A stand for holding an item, the stand comprising:
a base plate provided to support the stand;
a plurality of hinge assemblies connected to the base plate; and
a platform assembly pivotally connected to the hinge assemblies and supported by the hinge assemblies, such that the angular disposition of the platform assembly is adjustable relative to the base plate, the platform assembly including:
a main platform section that includes a lower platform section disposed along a lower edge of the main platform section; and
a support assembly connected to the lower platform section, the support assembly having opposing ends, and the support assembly pivotally connected to a respective hinge assembly, of the plurality of hinge assemblies, at each such end of the support assembly; and
each hinge assembly including:
a base pin housing that includes a bore, the base pin housing mounted upon the base plate, and
a pin assembly that includes a pin portion, the pin portion extending out from an end, of the opposing ends, of the support assembly and into a respective bore of the base pin housing, and such that two opposing pin portions are provided that respectively extend out from an opposing end, of the opposing ends, of the support assembly to be supported by and secured within respective base pin housings; and the pin assembly at each end of the support assembly being frictionally engaged within a respective base pin housing, of the base pin housings, such frictional engagement providing resistance to rotation of the support assembly relative to each base pin housing; and the support assembly including a channel extending along the length of the support assembly, the channel adapted to support a lower edge of an item resting therein.

17. The stand of claim 16, the channel constituted by a curved surface.

18. The stand of claim 17, the support assembly including a lower surface, the lower surface constituted by a curved surface.

19. A stand for holding an item, the stand comprising:
a base plate provided to support the stand;
a plurality of hinge assemblies connected to the base plate; and
a platform assembly pivotally connected to the hinge assemblies and supported by the hinge assemblies, such that the angular disposition of the platform assembly is adjustable relative to the base plate, the platform assembly including:
a main platform section that includes a lower platform section disposed along a lower edge of the main platform section; and
a support assembly connected to the lower platform section, the support assembly having opposing ends, and the support assembly pivotally connected to a respective hinge assembly, of the plurality of hinge assemblies, at each such end of the support assembly; and
each hinge assembly including:
a base pin housing that includes a bore, the base pin housing mounted upon the base plate, and
a pin assembly that includes a pin portion, the pin portion extending out from an end, of the opposing ends, of the support assembly and into a respective bore of the base pin housing, and such that two opposing pin portions are provided that respectively extend out from an opposing end, of the opposing ends, of the support assembly to be supported by and secured within respective base pin housings; and the pin assembly at each end of the support assembly being frictionally engaged within a respective base pin housing, of the base pin housings, such frictional engagement providing resistance to rotation of the support assembly relative to each base pin housing; and each pin portion including a threaded bar that is threadably disposed within each end of the support assembly, and a securement mechanism disposed on each threaded bar in such manner that each threaded bar is retained relative to the base pin housing in which the respective threaded bar is retained; and each base pin housing comprising a counterbore arrangement, the counterbore arrangement including:
  a small bore to frictionally engage a respective hinge knob disposed on each end, of the opposing ends, of the support assembly;
  a large bore to enclose a respective pin assembly, of the pin assemblies.

\* \* \* \* \*